United States Patent
Nakano

(10) Patent No.: US 9,880,375 B2
(45) Date of Patent: Jan. 30, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Masatsugu Nakano, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/094,414

(22) Filed: Apr. 8, 2016

(65) Prior Publication Data

US 2016/0306147 A1   Oct. 20, 2016

(30) Foreign Application Priority Data

Apr. 16, 2015  (JP) ................................. 2015-084092

(51) Int. Cl.
| | | |
|---|---|---|
| *G02B 15/177* | (2006.01) | |
| *G02B 15/16* | (2006.01) | |
| *G02B 13/14* | (2006.01) | |

(52) U.S. Cl.
CPC ......... *G02B 15/177* (2013.01); *G02B 13/146* (2013.01); *G02B 15/161* (2013.01)

(58) Field of Classification Search
None
See application file for complete search history.

(56) References Cited

U.S. PATENT DOCUMENTS

| | | | | |
|---|---|---|---|---|
| 2008/0151385 A1* | 6/2008 | Ohashi | ................. | G02B 15/177 |
| | | | | 359/689 |
| 2009/0190235 A1* | 7/2009 | Nishimura | ........... | G02B 15/177 |
| | | | | 359/686 |
| 2011/0038054 A1* | 2/2011 | Maeda | ................... | G02B 13/04 |
| | | | | 359/649 |

FOREIGN PATENT DOCUMENTS

| | | |
|---|---|---|
| JP | 2009-230122 A | 10/2009 |
| JP | 2011-175174 A | 9/2011 |
| JP | 5806299 B2 | 11/2015 |

\* cited by examiner

*Primary Examiner* — Darryl J Collins
(74) *Attorney, Agent, or Firm* — Carter, DeLuca, Farrell & Schmidt, LLP

(57) ABSTRACT

Provided is a zoom lens, including: a negative first lens unit; an aperture stop; and a positive second lens unit, in which the first and second lens units are configured to move so that an interval between the first and second lens units is changed in an optical axis direction, in which the second lens unit includes a positive lens and a negative lens, and in which, when refractive indices of a material with respect to a wavelengths of 400 nm, 1,050 nm and 1,700 nm are respectively represented by Ns, Nm and Nl, and a relative partial dispersion θ of the material is expressed as: θ=(Ns−Nm)/(Ns−Nl), an average value $\theta IR(G2p)_{AVE}$ of relative partial dispersions of materials of the positive lens in the second lens unit, and an average value $\theta IR(G2n)_{AVE}$ of relative partial dispersions of materials of the negative lens in the second lens unit are appropriately set.

14 Claims, 19 Drawing Sheets

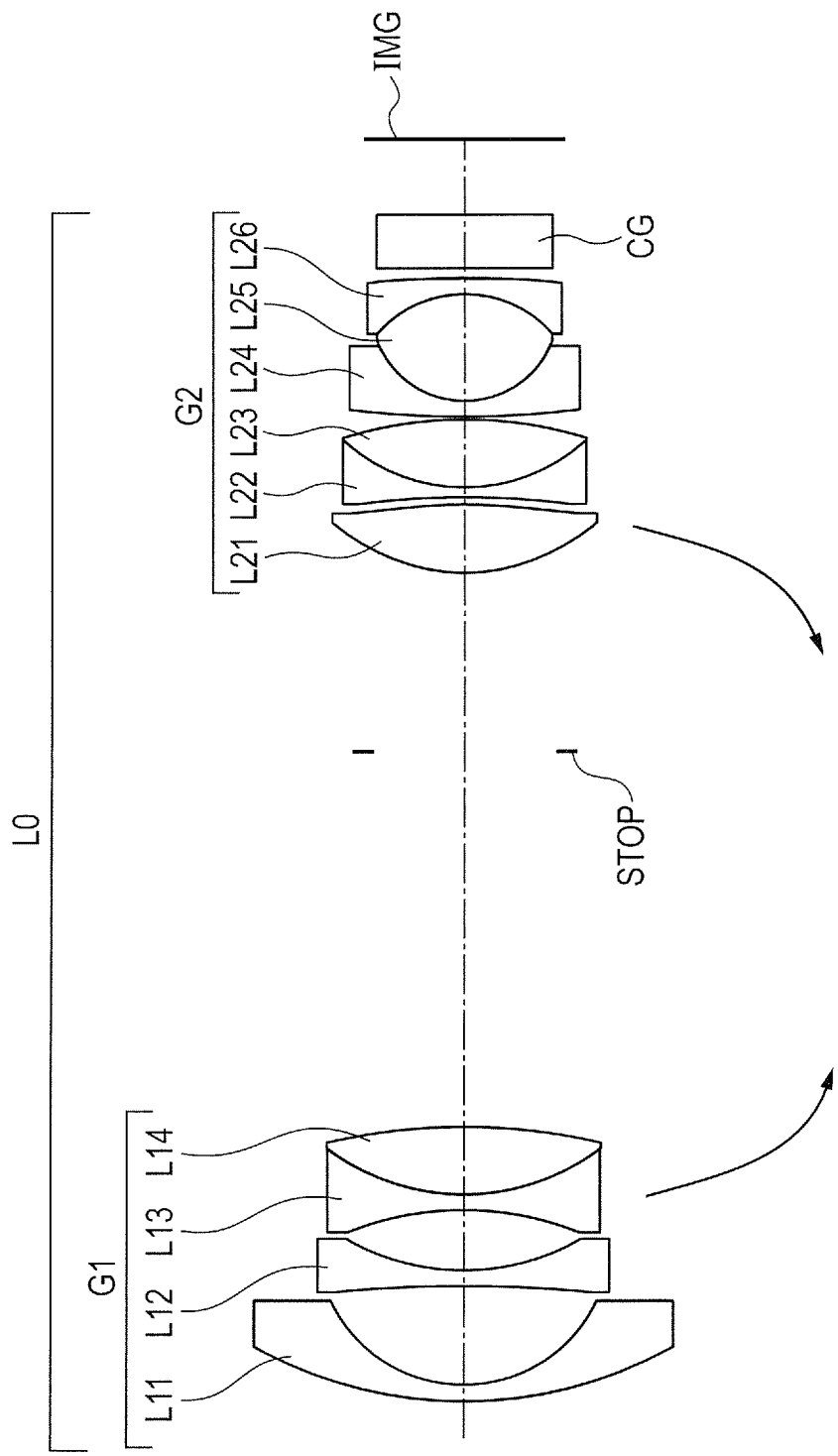

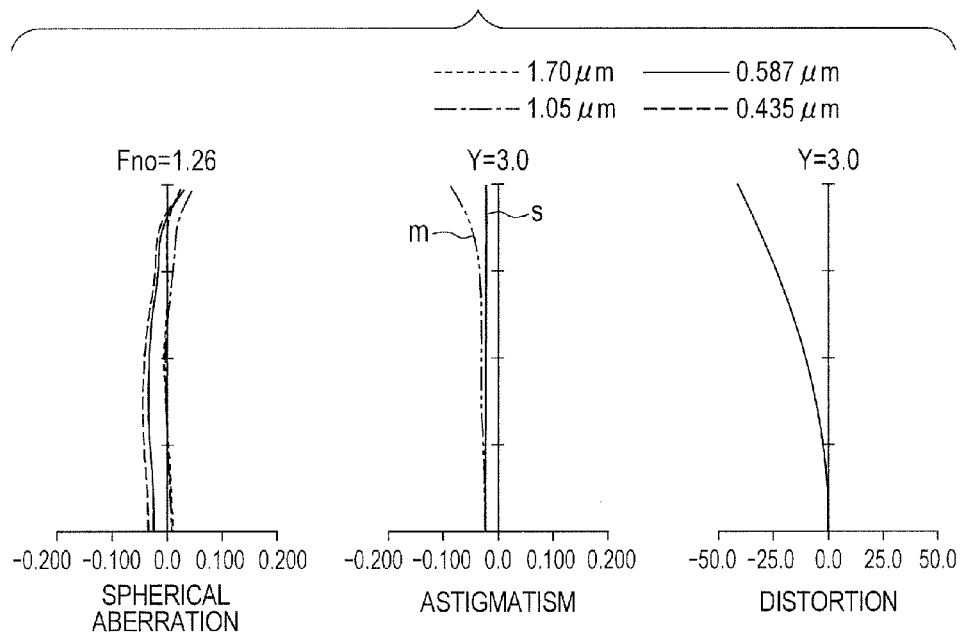
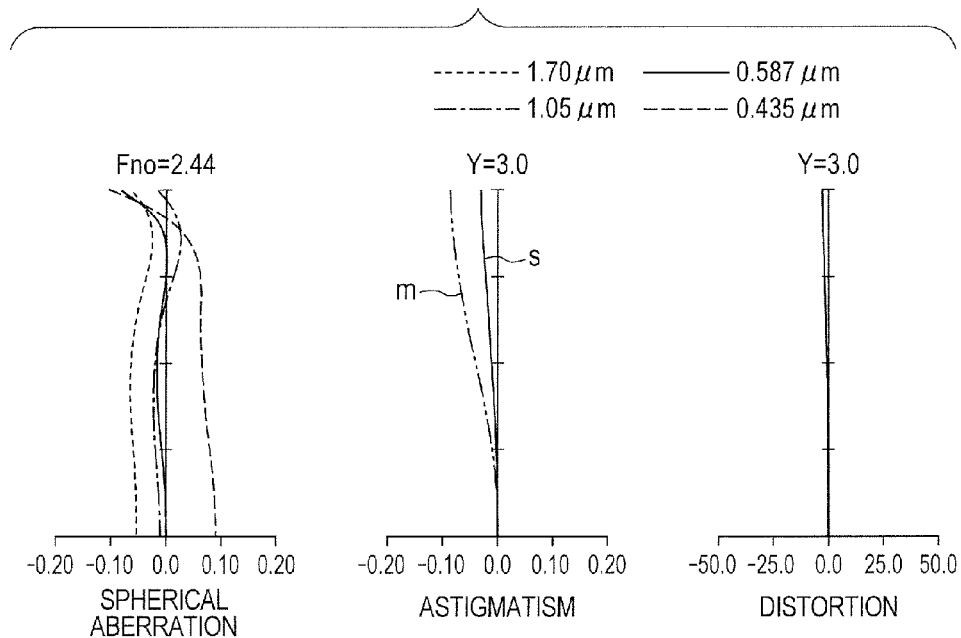

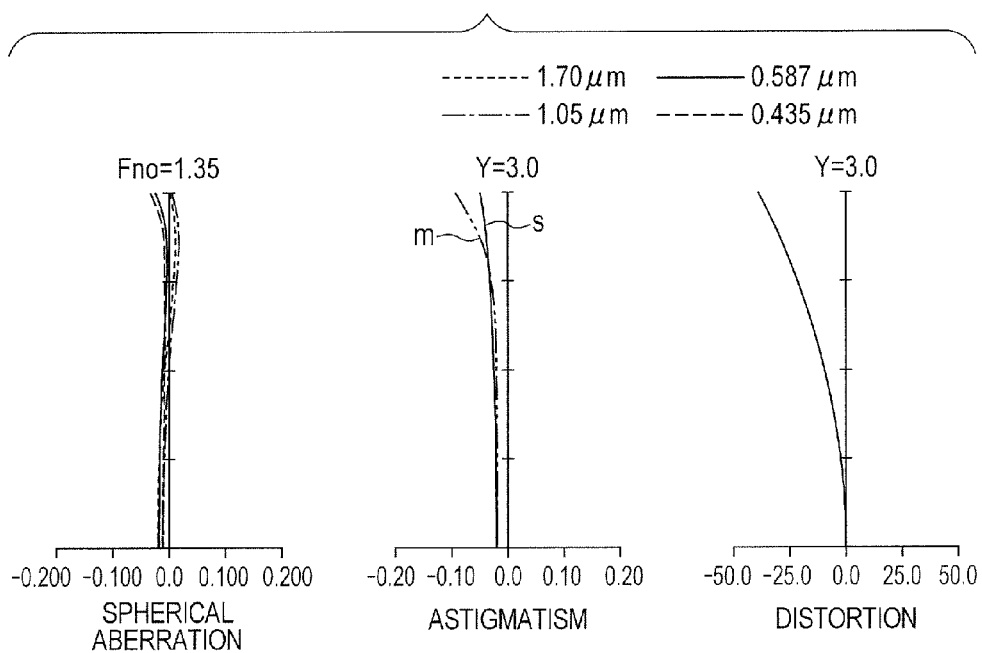
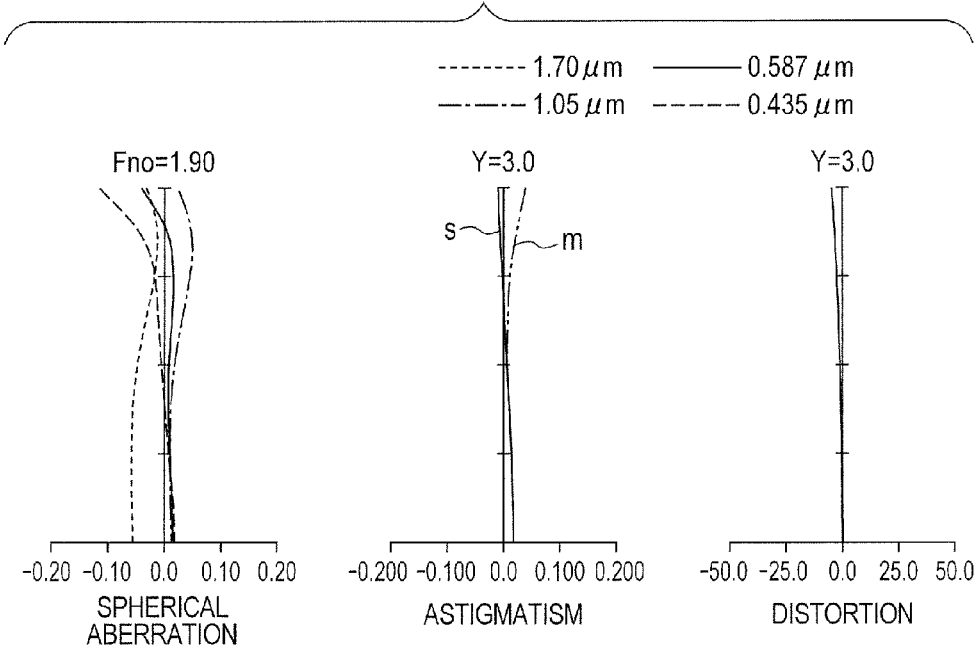

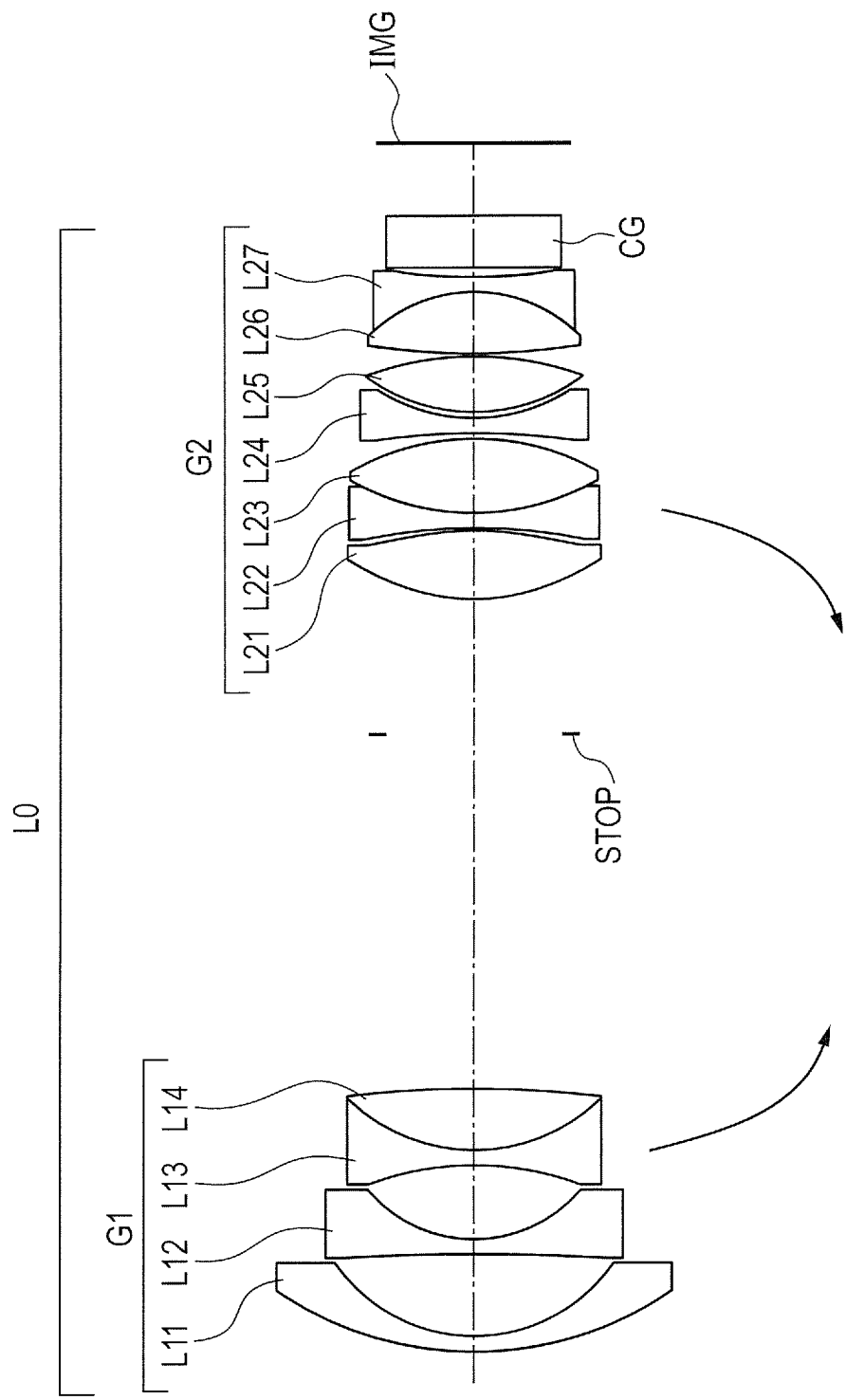

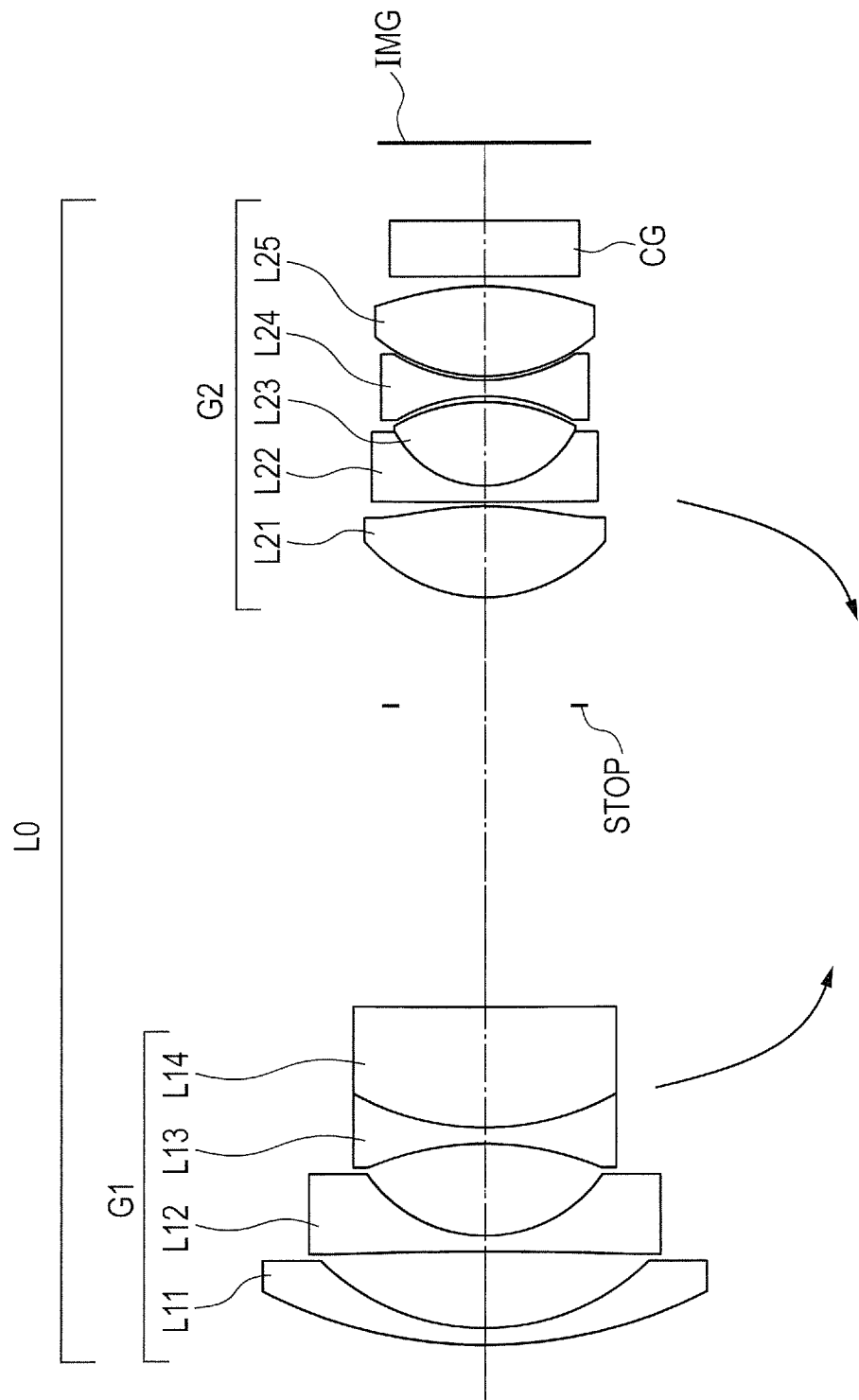

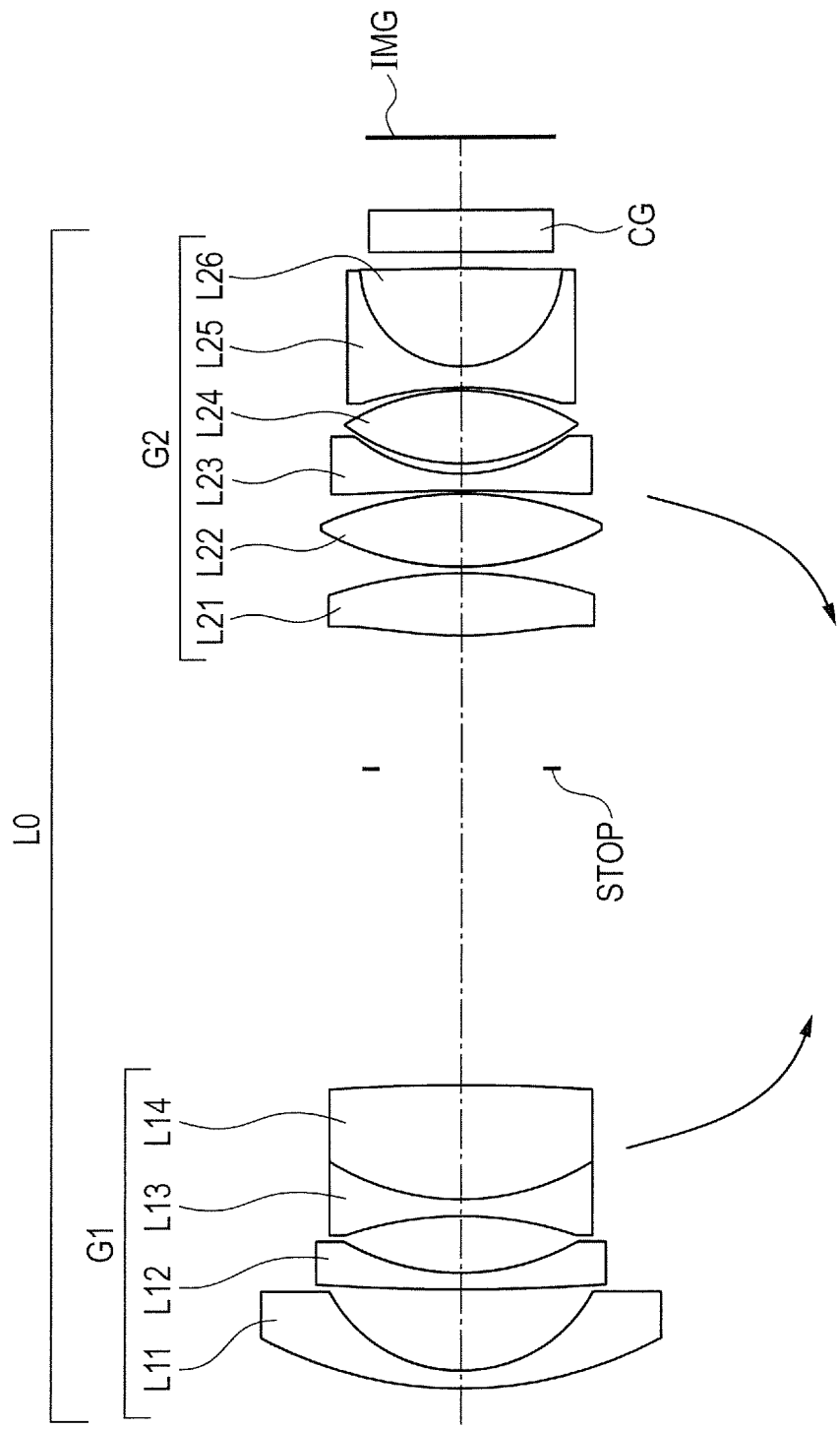

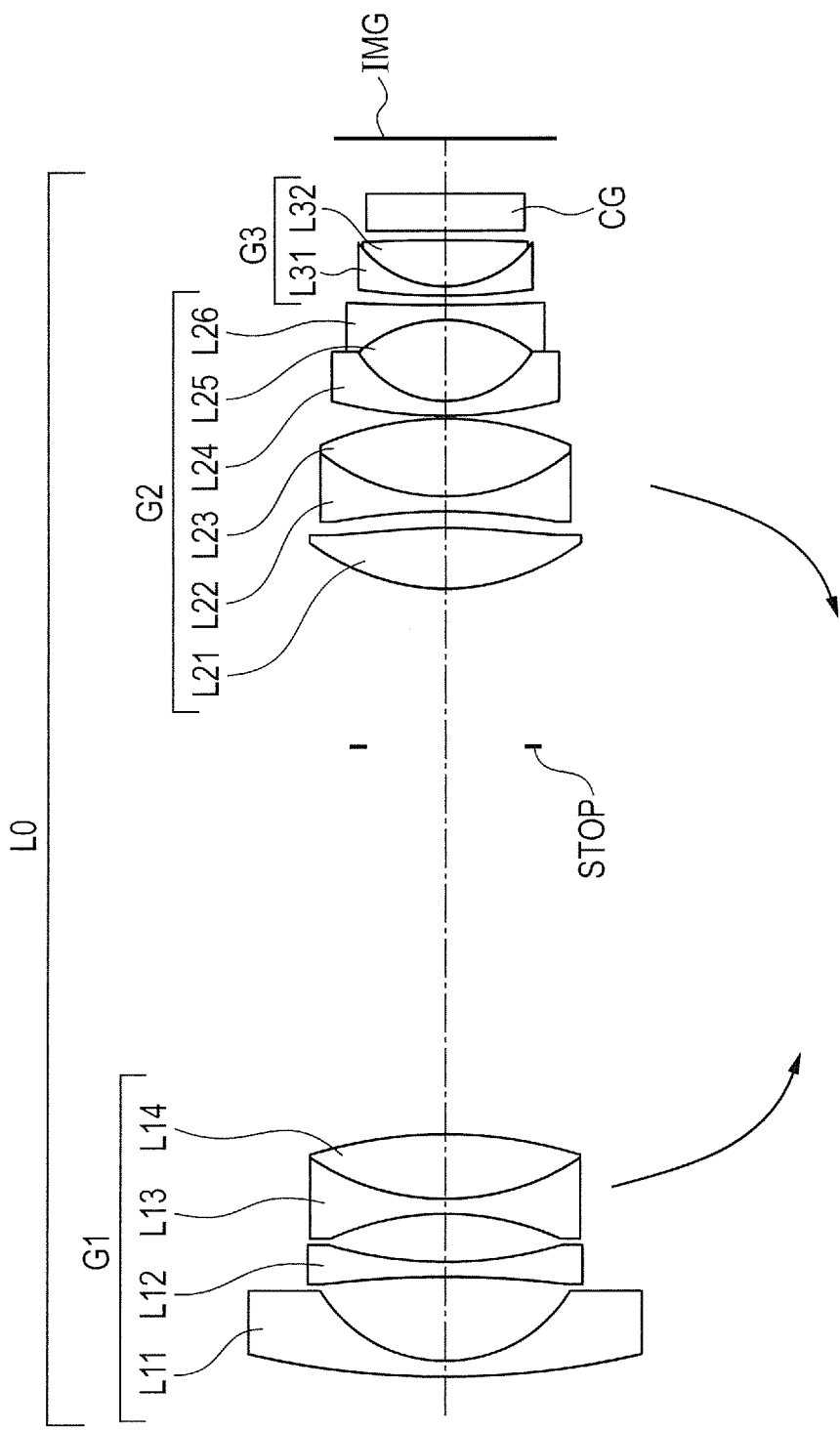

ZOOM LENS AND IMAGE PICKUP APPARATUS INCLUDING THE SAME

BACKGROUND OF THE INVENTION

Field of the Invention

The present invention relates to a zoom lens, and more particularly, to a zoom lens suitable as an image pickup optical system to be used in an image pickup apparatus, such as a monitoring camera, a digital camera, a video camera, and a broadcasting camera.

Description of the Related Art

In recent years, as an image pickup optical system to be used in an image pickup apparatus, a zoom lens is required to have a wide field angle and a small overall system size. For example, as an image pickup optical system to be used for a monitoring camera, a zoom lens is required to have a wide field angle and a small overall system size, and is also required that favorable optical characteristics can be obtained in imaging during daytime and at night.

In general, a monitoring camera uses visible light in imaging during daytime, and uses near-infrared light in imaging at night. The use of near-infrared light provides an advantage in that imaging can be carried out with less influence of scattering than when visible light is used, for example, in a dense fog with low visibility. Thus, it is demanded that a zoom lens used in a monitoring camera be corrected for an aberration in a broad wavelength range from a visible range to a near-infrared range.

In the related art, as the zoom lens for the monitoring camera, a two-unit zoom lens including, in order from an object side to an image side, a first lens unit having a negative refractive power, an aperture stop, and a second lens unit having a positive refractive power has been known. In a zoom lens disclosed in each of Japanese Patent No. 5806299, Japanese Patent Application Laid-Open No. 2011-175174, and Japanese Patent Application Laid-Open No. 2009-230122, an interval between the first lens unit and the second lens unit in an optical axis direction is changed to vary a magnification, and the first lens unit is moved to correct an image plane variation accompanying the magnification varying.

In the zoom lens for a monitoring camera, in order to obtain favorable optical characteristics over a broad wavelength range from a visible range to a near-infrared range, it is important to appropriately set the zoom type and the lens configuration of each lens unit. For example, in a zoom lens formed of at least two lens units including, in order from an object side to an image side, a first lens unit having a negative refractive power, and a second lens unit having a positive refractive power, it is important to appropriately set the second lens unit to satisfactorily correct chromatic aberration over a wide wavelength range.

SUMMARY OF THE INVENTION

According to one embodiment of the present invention, there is provided a zoom lens, including, in order from an object side to an image side:

a first lens unit having a negative refractive power;
an aperture stop; and
a second lens unit having a positive refractive power,
in which the first lens unit and the second lens unit are configured to move during zooming so that an interval between the first lens unit and the second lens unit is changed in an optical axis direction,
in which the second lens unit includes at least one positive lens and at least one negative lens, and
in which, when a refractive index of a material with respect to a wavelength of 400 nm is represented by Ns, a refractive index of the material with respect to a wavelength of 1,050 nm is represented by Nm, a refractive index of the material with respect to a wavelength of 1,700 nm is represented by Nl, and a relative partial dispersion $\theta$ of the material is expressed as:

$$\theta=(Ns-Nm)/(Ns-Nl),$$

the following conditional expression is satisfied:

$$-0.020<\theta IR(G2p)_{AVE}-\theta IR(G2n)_{AVE}<0.015,$$

where $\theta IR(G2p)_{AVE}$ represents an average value of relative partial dispersions of materials of the positive lens included in the second lens unit, and $\theta IR(G2n)_{AVE}$ represents an average value of relative partial dispersions of materials of the negative lens included in the second lens unit.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens at a wide angle end according to Embodiment 1 of the present invention.

FIG. 2A is a diagram for showing aberrations at the wide angle end of the zoom lens of Embodiment 1.

FIG. 2B is a diagram for showing aberrations at a telephoto end of the zoom lens of Embodiment 1.

FIG. 8A is a diagram for showing aberrations at the wide angle end of the zoom lens of Embodiment 4.

FIG. 8B is a diagram for showing aberrations at a telephoto end of the zoom lens of Embodiment 4.

FIG. 9 is a lens cross-sectional view of a zoom lens at a wide angle end according to Embodiment 5 of the present invention.

FIG. 11 is a lens cross-sectional view of a zoom lens at a wide angle end according to Embodiment 6 of the present invention.

FIG. 15 is a lens cross-sectional view of a zoom lens at a wide angle end according to Embodiment 8 of the present invention.

FIG. 17 is a lens cross-sectional view of a zoom lens at a wide angle end according to Embodiment 9 of the present invention.

DESCRIPTION OF THE EMBODIMENTS

Preferred embodiments of the present invention will now be described in detail in accordance with the accompanying drawings.

Now, a zoom lens of an embodiment of the present invention is described. The zoom lens according to the present invention includes, in order from an object side to an image side, a first lens unit having a negative refractive power, an aperture stop, and a second lens unit having a positive refractive power. Then, the first lens unit and the second lens unit are configured to move so that an interval between the first lens unit and the second lens unit in an optical axis direction is changed during zooming. Note that, a third lens unit having a positive refractive power, which is configured not to move during zooming, may be arranged on the image side of the second lens unit.

FIG. 1 is a lens cross-sectional view at the wide angle end of a zoom lens according to Embodiment 1 of the present invention. FIG. 2A and FIG. 2B are aberration diagrams at the wide angle end and the telephoto end, respectively, of the zoom lens of Embodiment 1. An optical magnification is 3.44, and in the zoom lens according to Embodiment 1, aberrations are sufficiently corrected at least for light in a wavelength range of from 400 nm to 1,700 nm.

Figure 3:
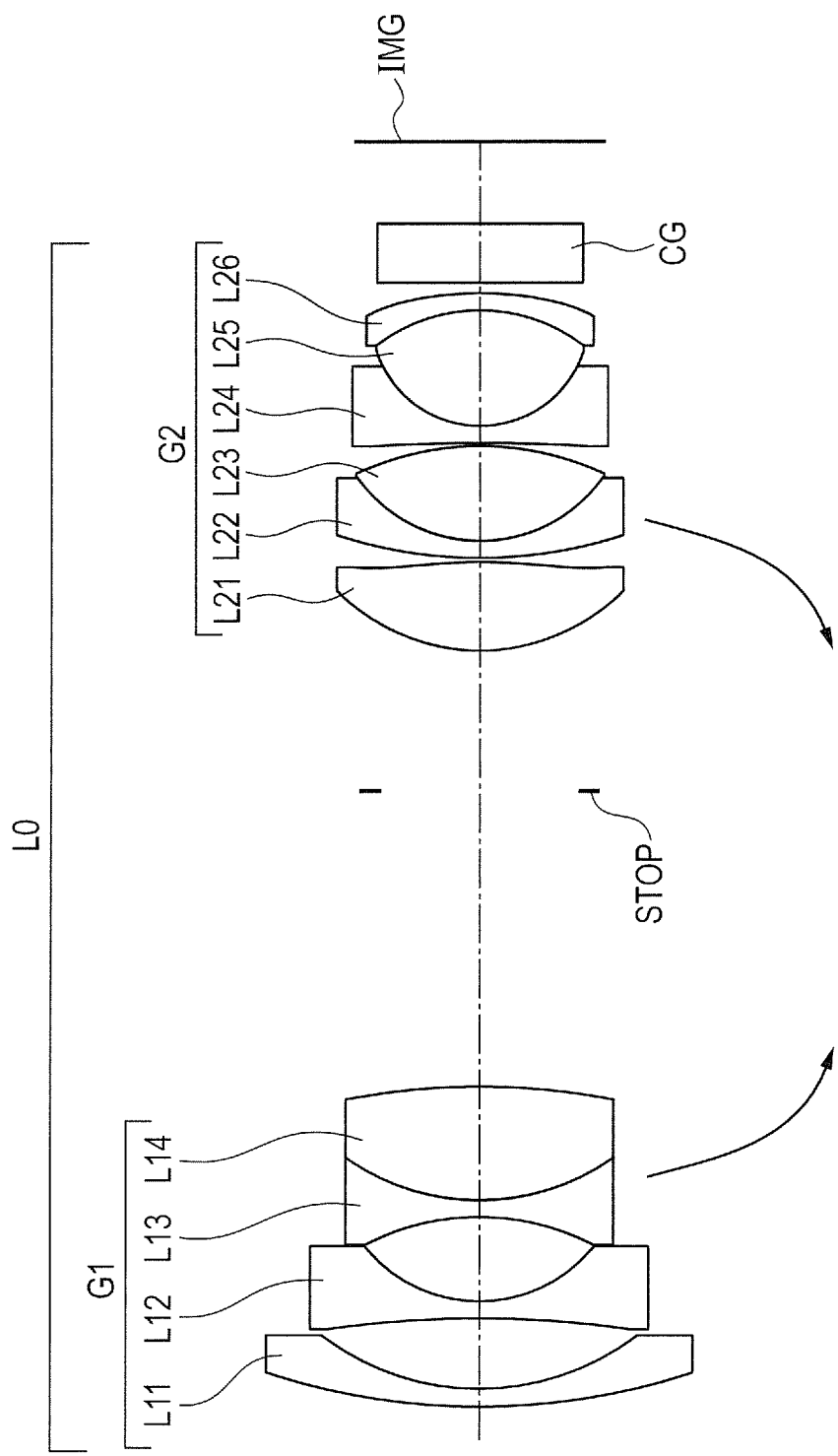
FIG. 3 is a lens cross-sectional view of a zoom lens at a wide angle end according to Embodiment 2 of the present invention.
Figure 4A:
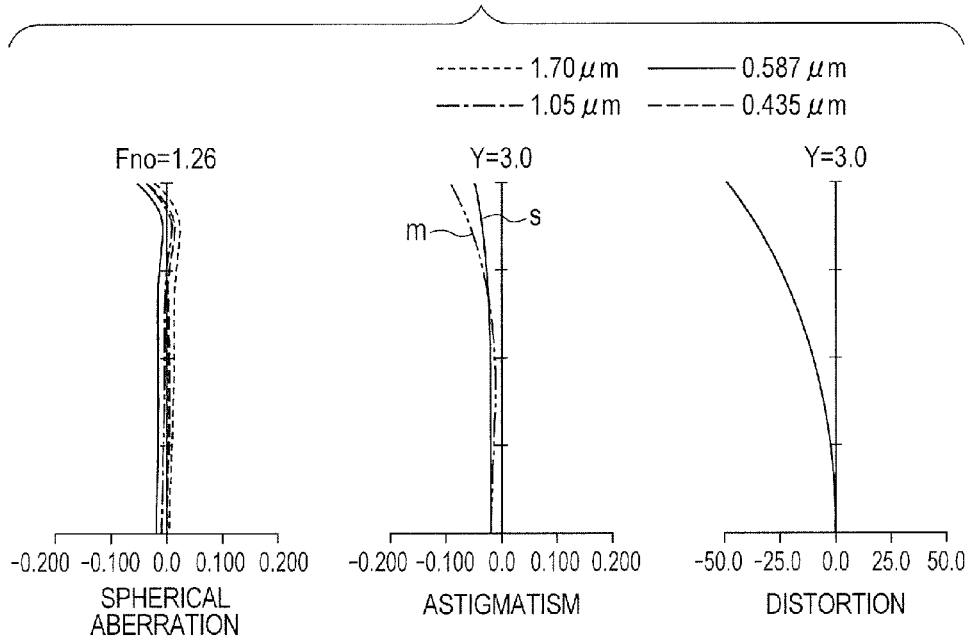
FIG. 4A is a diagram for showing aberrations at the wide angle end of the zoom lens of Embodiment 2.
Figure 4B:
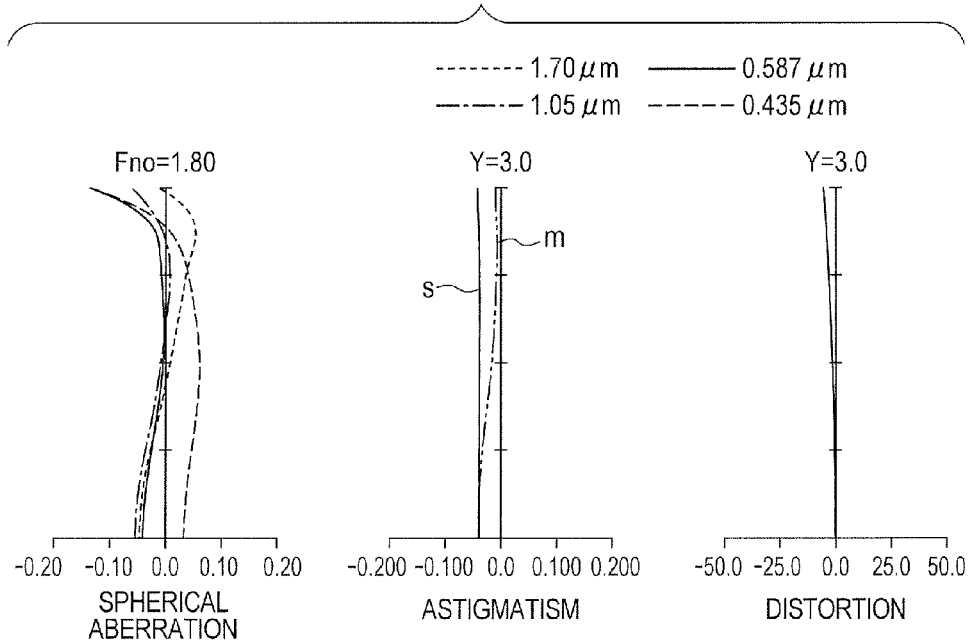
FIG. 4B is a diagram for showing aberrations at a telephoto end of the zoom lens of Embodiment 2.

FIG. 3 is a lens cross-sectional view at the wide angle end of a zoom lens according to Embodiment 2 of the present invention. FIG. 4A and FIG. 4B are aberration diagrams at the wide angle end and the telephoto end, respectively, of the zoom lens of Embodiment 2. The optical magnification is 2.58, and aberrations are sufficiently corrected at least for light in a wavelength range of from 400 nm to 1,700 nm.

Figure 5:
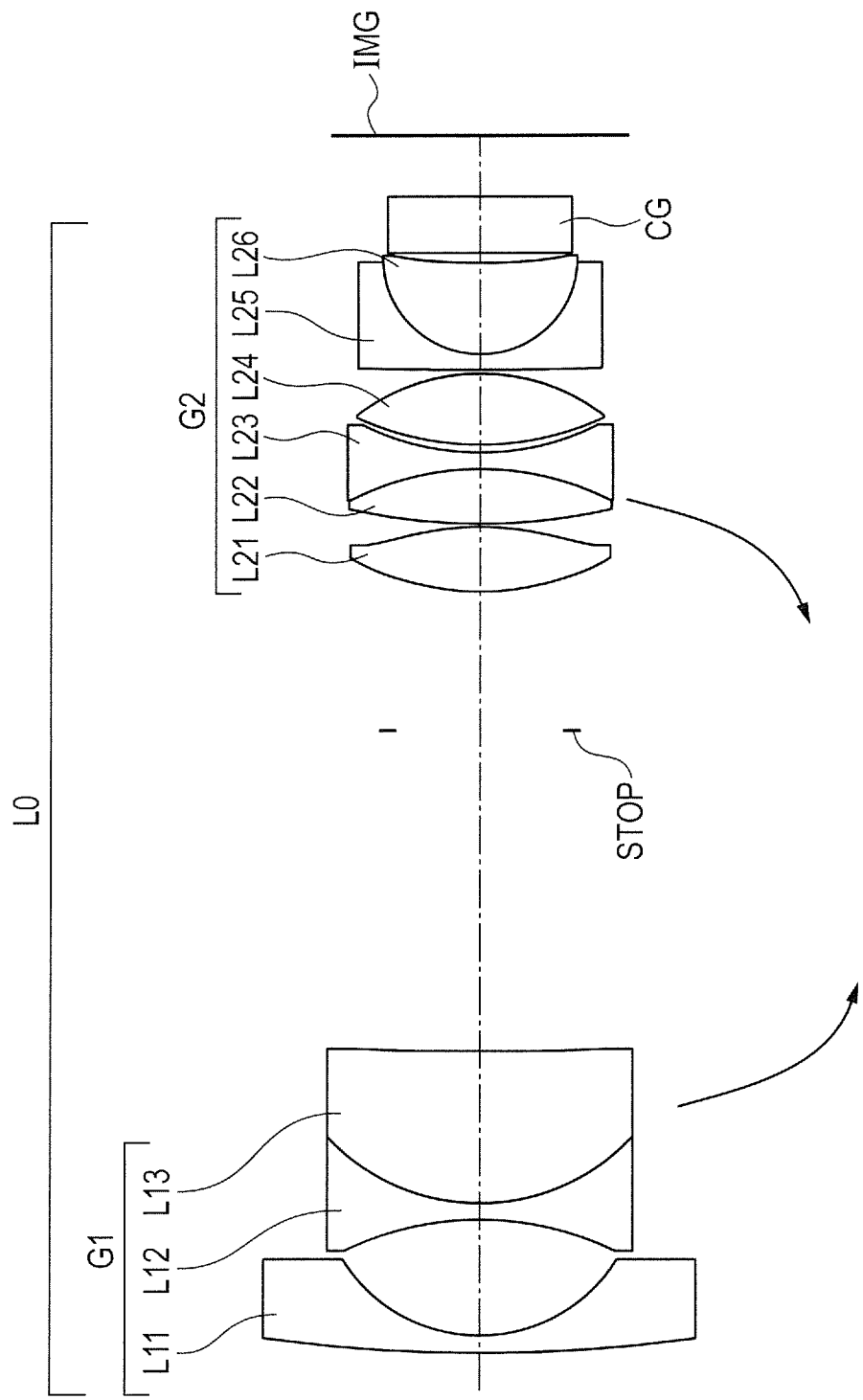
FIG. 5 is a lens cross-sectional view of a zoom lens at a wide angle end according to Embodiment 3 of the present invention.
Figure 6A:
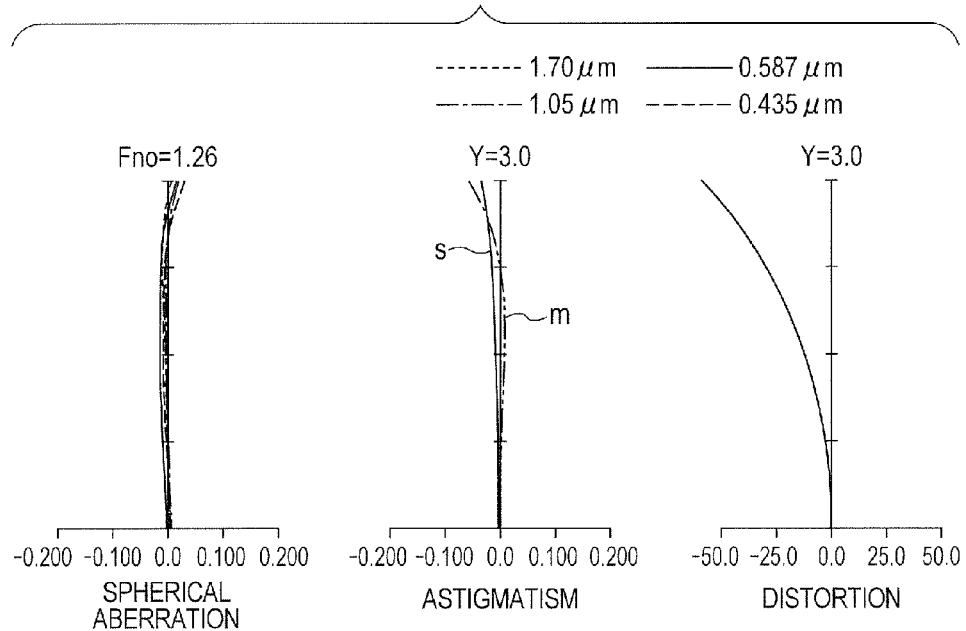
FIG. 6A is a diagram for showing aberrations at the wide angle end of the zoom lens of Embodiment 3.
Figure 6B:
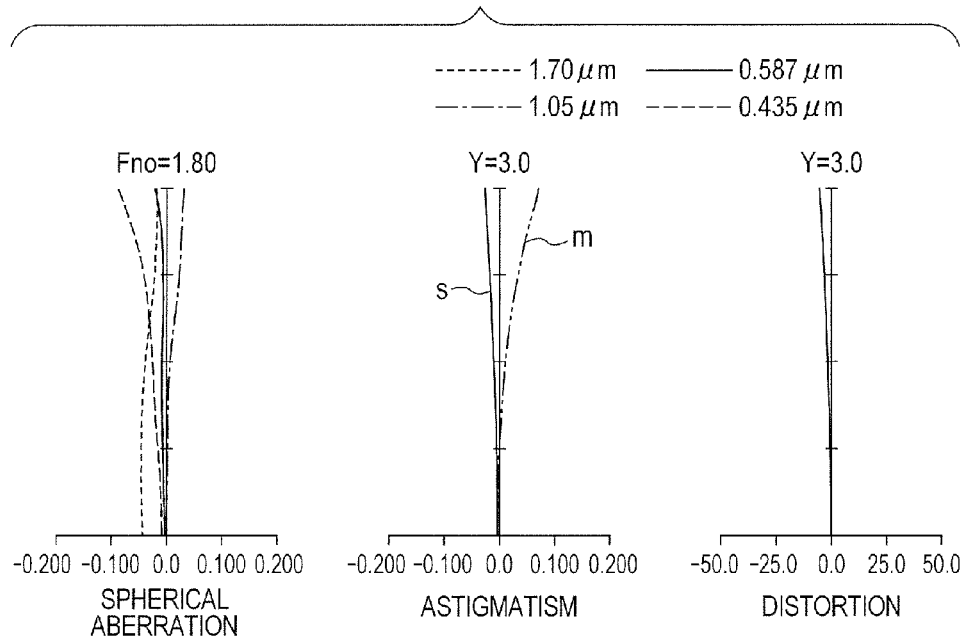
FIG. 6B is a diagram for showing aberrations at a telephoto end of the zoom lens of Embodiment 3.

FIG. 5 is a lens cross-sectional view at the wide angle end of a zoom lens according to Embodiment 3 of the present invention. FIG. 6A and FIG. 6B are aberration diagrams at the wide angle end and the telephoto end, respectively, of the zoom lens of Embodiment 3. The optical magnification is 2.58, and aberrations are sufficiently corrected at least for light in a wavelength range of from 400 nm to 1,700 nm.

Figure 7:
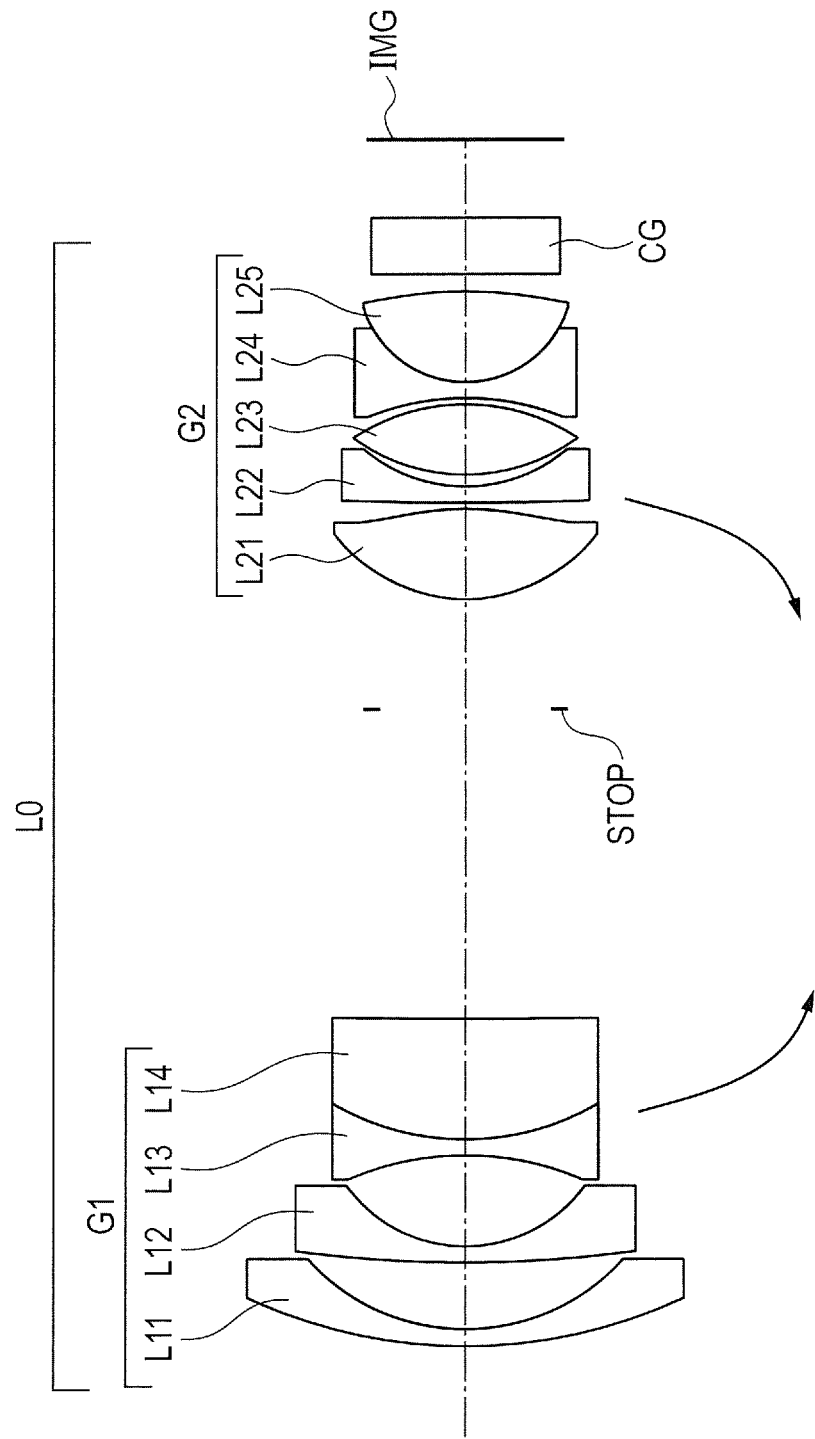
FIG. 7 is a lens cross-sectional view of a zoom lens at a wide angle end according to Embodiment 4 of the present invention.

FIG. 7 is a lens cross-sectional view at the wide angle end of a zoom lens according to Embodiment 4 of the present invention. FIG. 8A and FIG. 8B are aberration diagrams at the wide angle end and the telephoto end, respectively, of the zoom lens of Embodiment 4. The optical magnification is 2.58, and aberrations are sufficiently corrected at least for light in a wavelength range of from 400 nm to 1,700 nm.

Figure 10A:
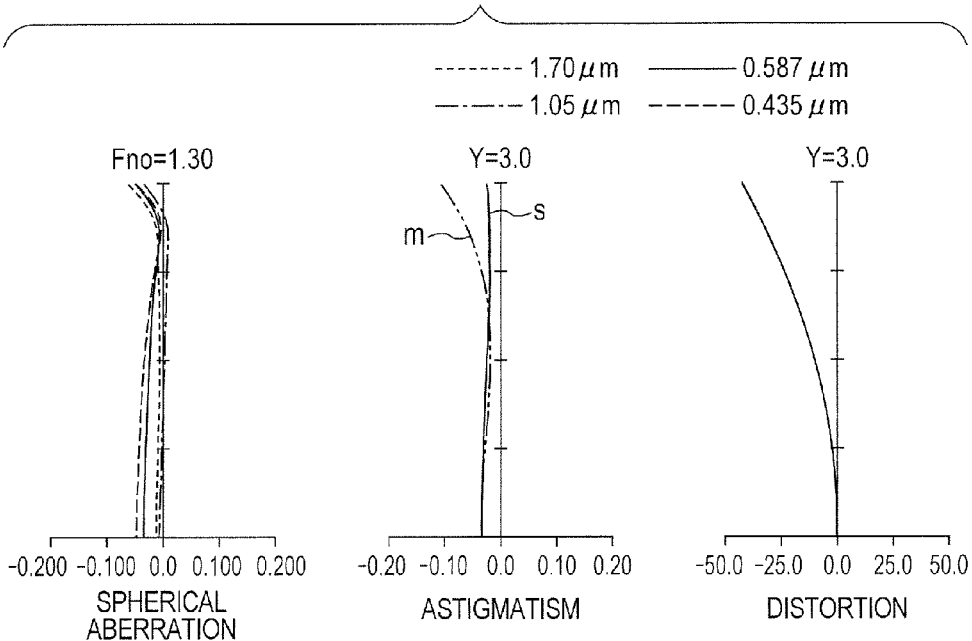
FIG. 10A is a diagram for showing aberrations at the wide angle end of the zoom lens of Embodiment 5.
Figure 10B:
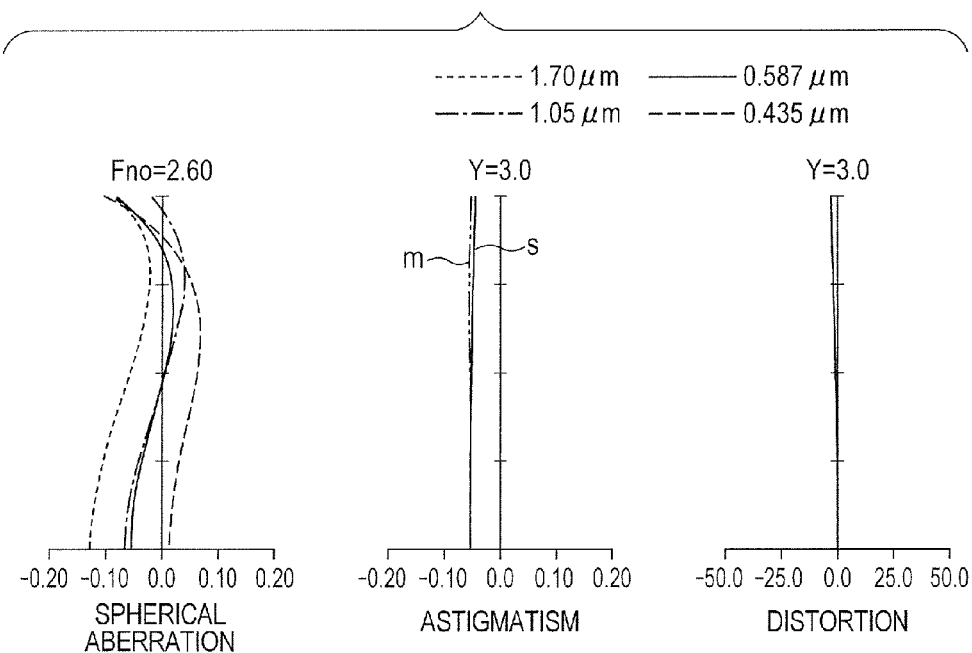
FIG. 10B is a diagram for showing aberrations at a telephoto end of the zoom lens of Embodiment 5.

FIG. 9 is a lens cross-sectional view at the wide angle end of a zoom lens according to Embodiment 5 of the present invention. FIG. 10A and FIG. 10B are aberration diagrams at the wide angle end and the telephoto end, respectively, of the zoom lens of Embodiment 5. The optical magnification is 3.45, and aberrations are sufficiently corrected at least for light in a wavelength range of from 400 nm to 1,700 nm.

Figure 12A:
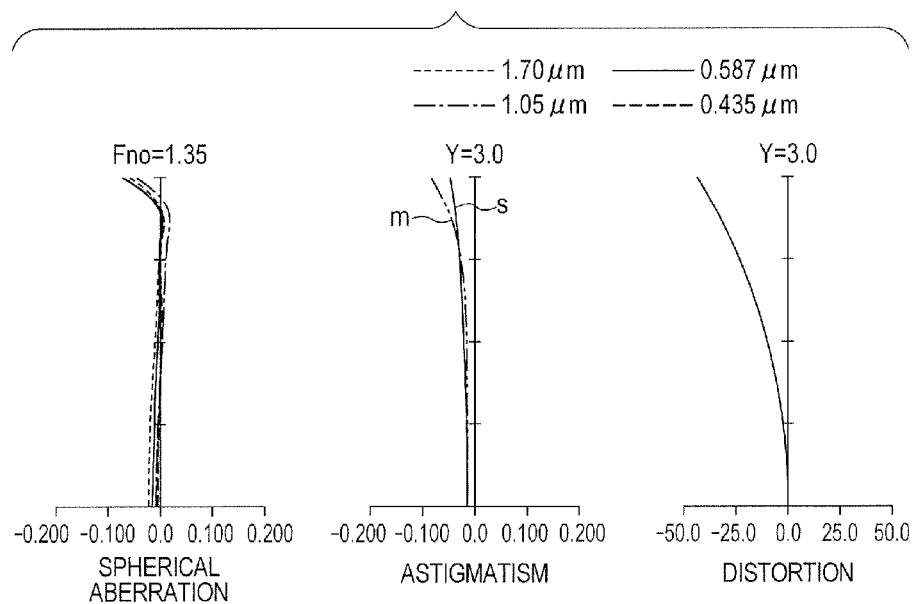
FIG. 12A is a diagram for showing aberrations at the wide angle end of the zoom lens of Embodiment 6.
Figure 12B:
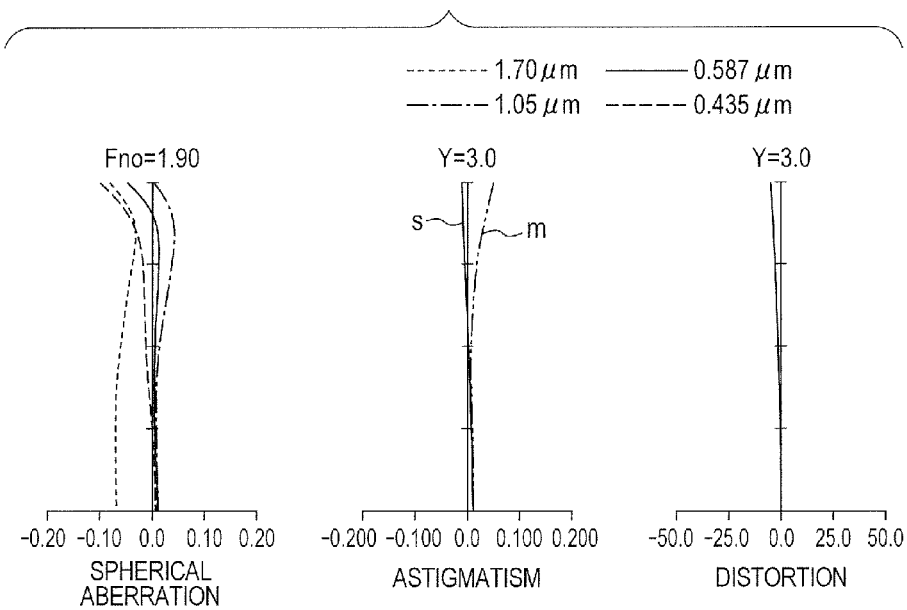
FIG. 12B is a diagram for showing aberrations at a telephoto end of the zoom lens of Embodiment 6.

FIG. 11 is a lens cross-sectional view at the wide angle end of a zoom lens according to Embodiment 6 of the present invention. FIG. 12A and FIG. 12B are aberration diagrams at the wide angle end and the telephoto end, respectively, of the zoom lens of Embodiment 6. The optical magnification is 2.58, and aberrations are sufficiently corrected at least for light in a wavelength range of from 400 nm to 1,700 nm.

Figure 13:
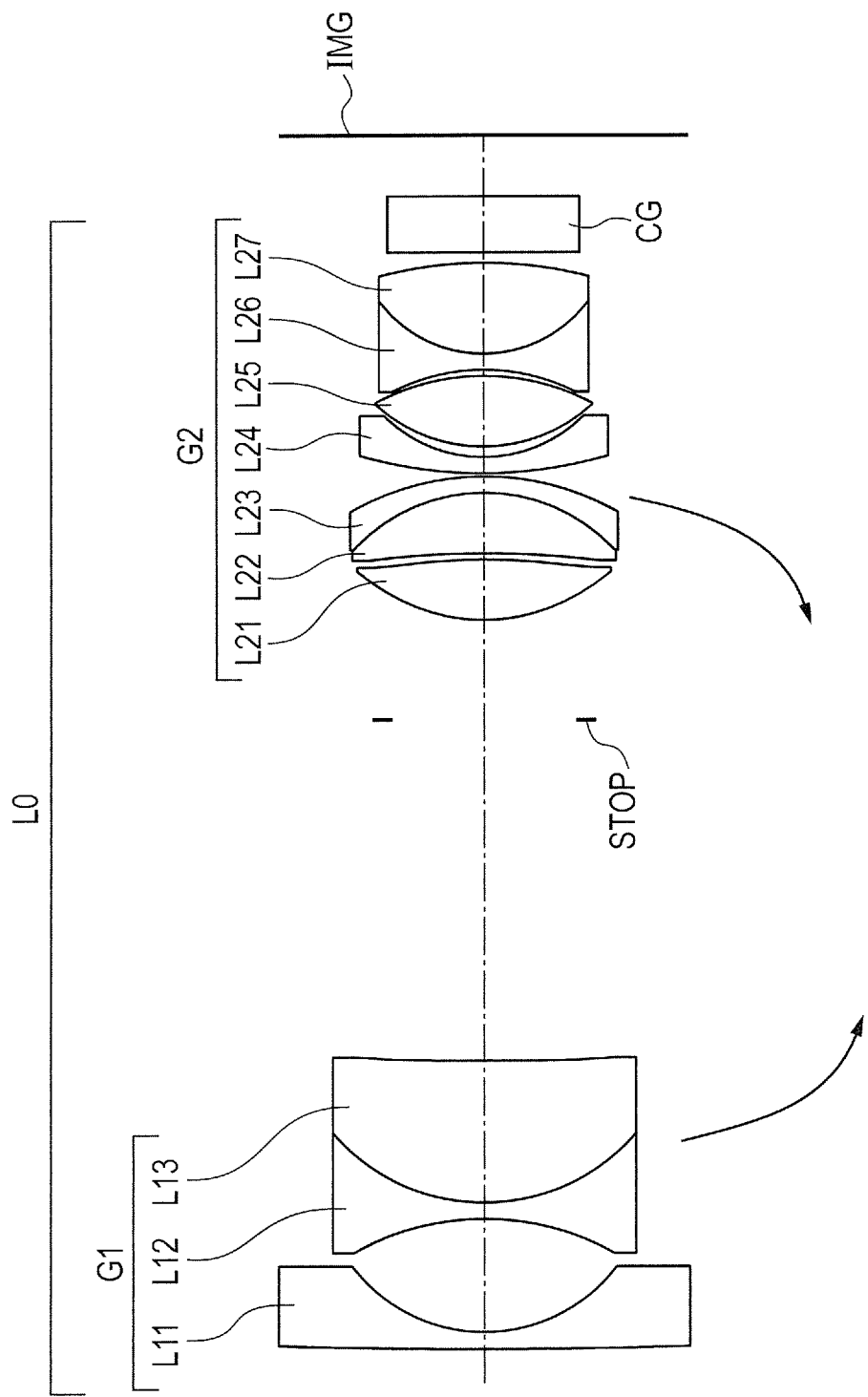
FIG. 13 is a lens cross-sectional view of a zoom lens at a wide angle end according to Embodiment 7 of the present invention.
Figure 14A:
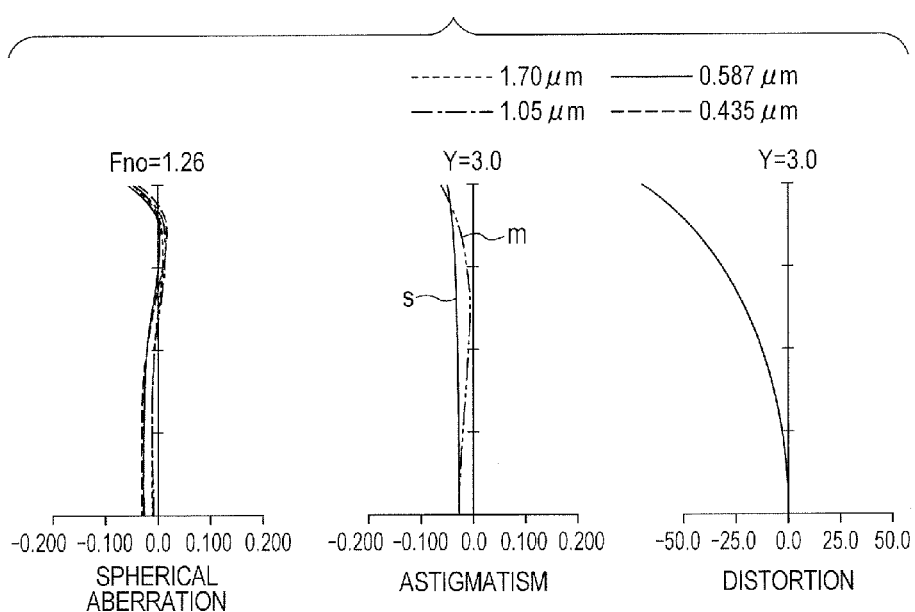
FIG. 14A is a diagram for showing aberrations at the wide angle end of the zoom lens of Embodiment 7.
Figure 14B:
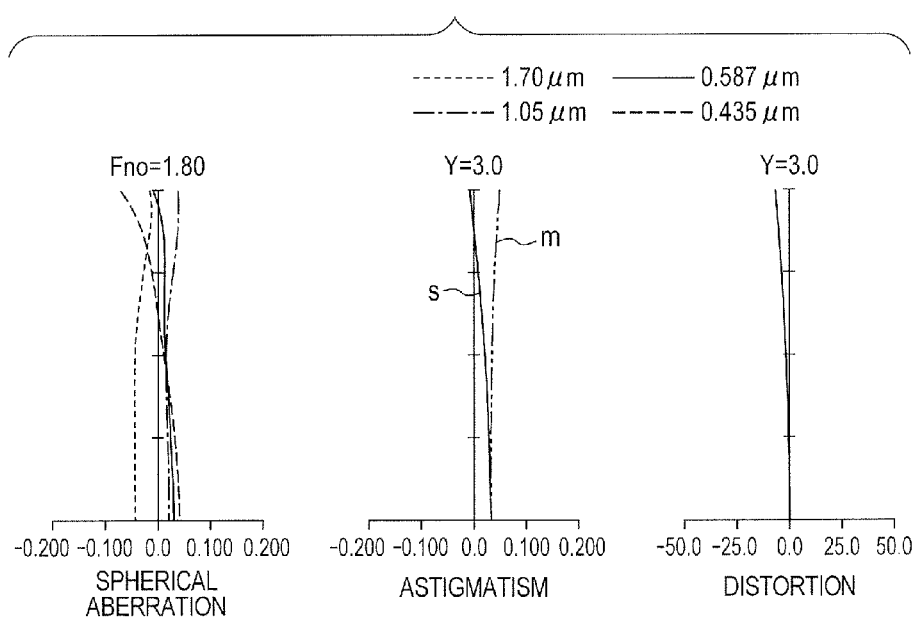
FIG. 14B is a diagram for showing aberrations at a telephoto end of the zoom lens of Embodiment 7.

FIG. 13 is a lens cross-sectional view at the wide angle end of a zoom lens according to Embodiment 7 of the present invention. FIG. 14A and FIG. 14B are aberration diagrams at the wide angle end and the telephoto end, respectively, of the zoom lens of Embodiment 7. The optical magnification is 2.58, and aberrations are sufficiently corrected at least for light in a wavelength range of from 400 nm to 1,700 nm.

Figure 16A:
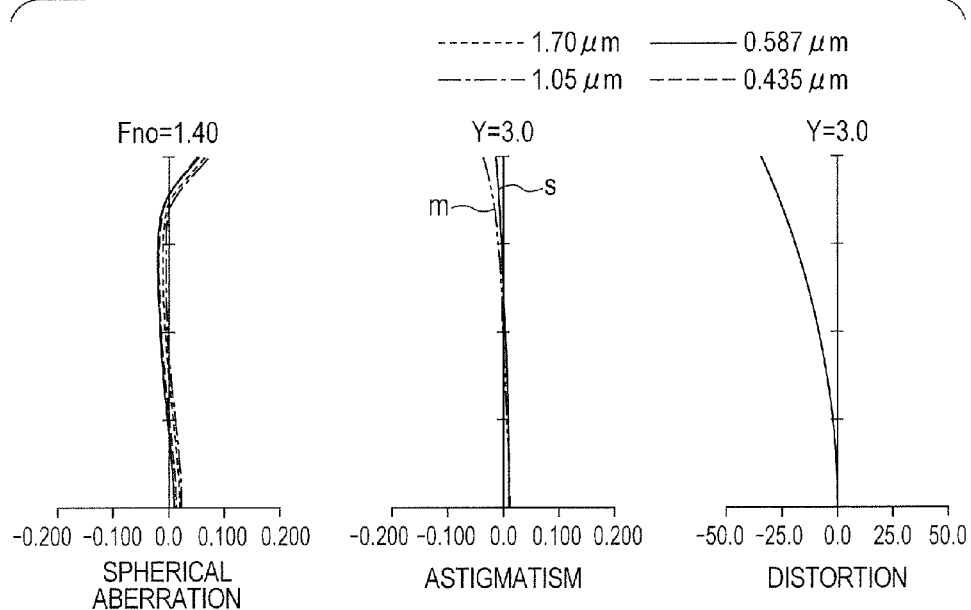
FIG. 16A is a diagram for showing aberrations at the wide angle end of the zoom lens of Embodiment 8.
Figure 16B:
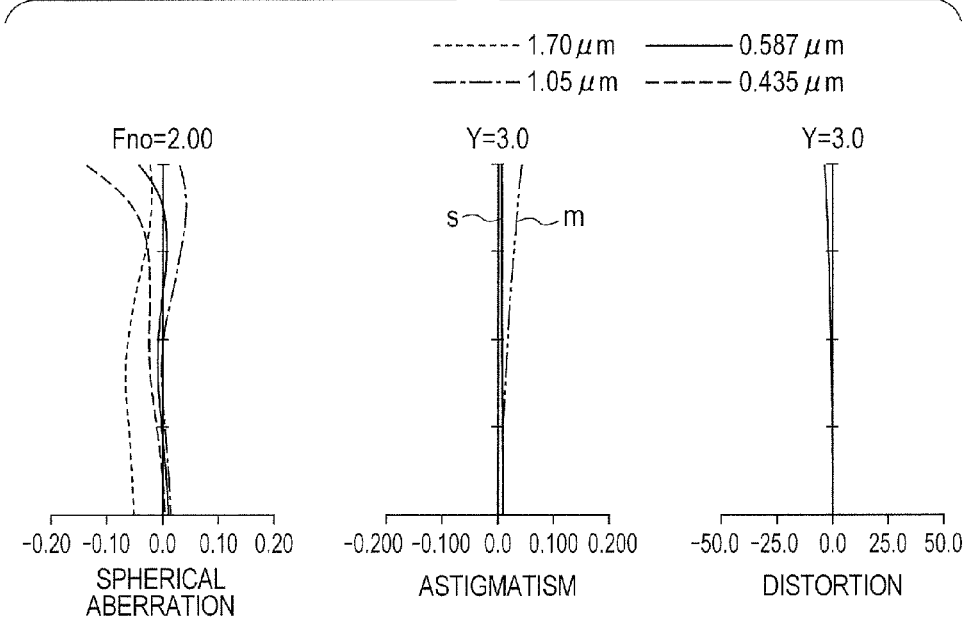
FIG. 16B is a diagram for showing aberrations at a telephoto end of the zoom lens of Embodiment 8.

FIG. 15 is a lens cross-sectional view at the wide angle end of a zoom lens according to Embodiment 8 of the present invention. FIG. 16A and FIG. 16B are aberration diagrams at the wide angle end and the telephoto end, respectively, of the zoom lens of Embodiment 8. The optical magnification is 2.58, and aberrations are sufficiently corrected at least for light in a wavelength range of from 400 nm to 1,700 nm.

Figure 18A:
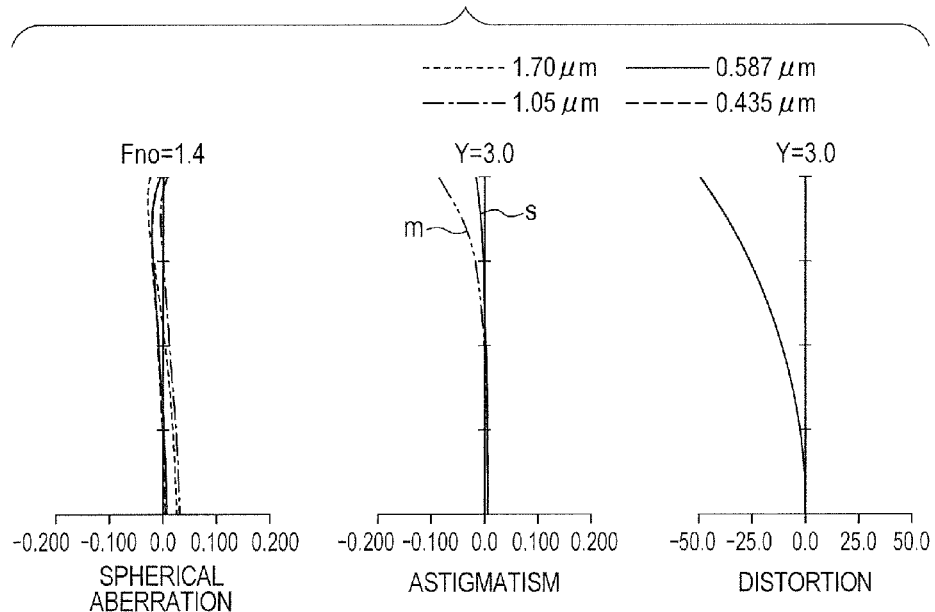
FIG. 18A is a diagram for showing aberrations at the wide angle end of the zoom lens of Embodiment 9.
Figure 18B:
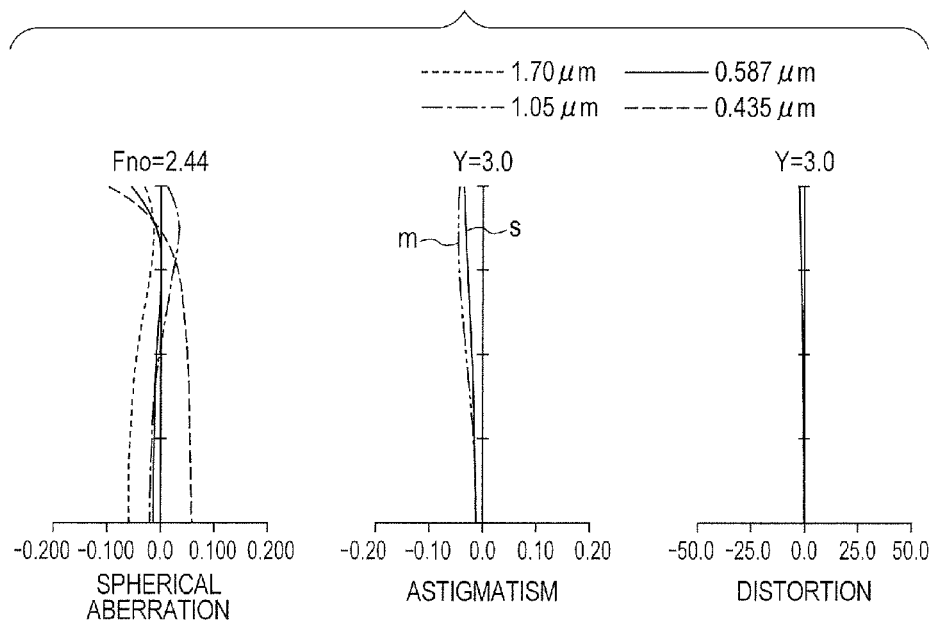
FIG. 18B is a diagram for showing aberrations at a telephoto end of the zoom lens of Embodiment 9.
Figure 19:
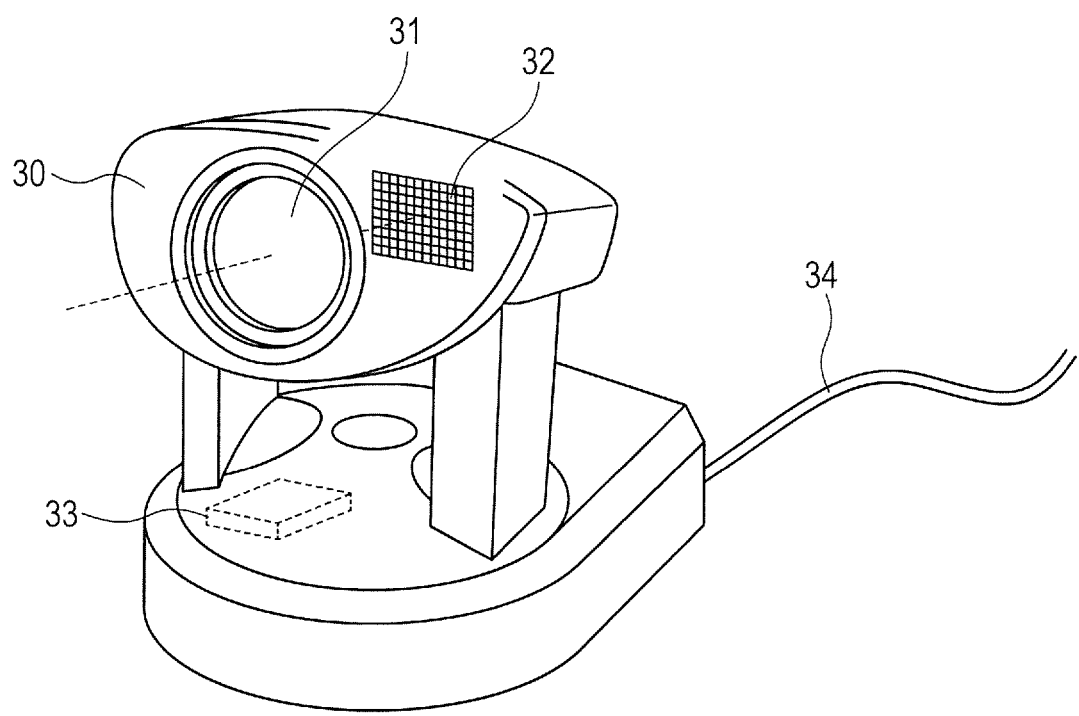
FIG. 19 is a schematic view of a main part of an image pickup apparatus according to the present invention.

FIG. 17 is a lens cross-sectional view at the wide angle end of a zoom lens according to Embodiment 9 of the present invention. FIG. 18A and FIG. 18B are aberration diagrams at the wide angle end and the telephoto end, respectively, of the zoom lens of Embodiment 9. The optical magnification is 3.45, and aberrations are sufficiently corrected at least for light in a wavelength range of from 400 nm to 1,700 nm. FIG. 19 is a schematic view of a main part of an image pickup apparatus according to the present invention.

The zoom lens according to each of the embodiments is used in the image pickup apparatus. In each of the lens cross-sectional views, the left side corresponds to the object side (object side), and the right side corresponds to the image side. Symbol LO represents the zoom lens. A first lens unit G1 has a negative refractive power, a second lens unit G2 has a positive refractive power, and a third lens unit G3 has a positive refractive power. An F number determination member (hereinafter referred to also as "aperture stop") STOP has a function of aperture stop for determining (limiting) a minimum F number (Fno) light flux.

An optical block CG corresponds to an optical filter or the like. As an image plane IMG, a solid-state image pickup element (photo-electric conversion element) such as a CCD sensor and a CMOS sensor is arranged. The arrows indicate movement loci of the respective lens units during zooming from the wide angle end to the telephoto end.

In each of the embodiments, focusing is carried out in the first lens unit G1. In a spherical aberration diagram, aberrations at a wavelength of 1,700 nm, a wavelength of 1,050 nm, a wavelength of 587 nm (d-line), and a wavelength of 435 nm (g-line) are indicated. In an astigmatism diagram, symbol m represents a meridional image plane of the d-line, and symbol s represents a sagittal image plane of the d-line. The distortion is shown with respect to the d-line. An F-number is represented by Fno, and an image height is represented by Y.

Note that, in the following embodiments, the wide angle end and the telephoto end refer to zoom positions obtained when a lens unit for varying the magnification is located at respective ends of a range on a mechanism in which the stated lens unit can move along an optical axis. Unless otherwise indicated, the description is herein based on a premise that the lens structures are arranged in order from the object side to the image side. The zoom lens according to the present invention includes, in order from the object side to the image side: the first lens unit G1 having a negative refractive power; the aperture stop STOP; and the second lens unit G2 having a positive refractive power.

During zooming, an interval between the first lens unit G1 and the second lens unit G2 is changed. The second lens unit G2 is configured to move to vary a magnification, and an image plane variation accompanying the magnification varying is corrected by the first lens unit G1. The second lens unit G2 includes at least one positive lens, and at least one negative lens. A refractive index Ns of a material with respect to a wavelength of 400 nm, a refractive index Nm of the material with respect to a wavelength of 1,050 nm, a refractive index Nl of the material with respect to a wavelength of 1,700 nm, and a relative partial dispersion θ of the material are expressed as:

$$\theta = (Ns-Nm)/(Ns-Nl).$$

An average value of partial dispersion ratios of materials for the positive lenses included in the second lens unit G2 is represented by $\theta IR(G2p)_{AVE}$, and an average value of partial dispersion ratios of materials for the negative lenses included in the second lens unit G2 is represented by $\theta IR(G2n)_{AVE}$. At this time, the following conditional expression is satisfied.

$$-0.020 < \theta IR(G2p)_{AVE} - \theta IR(G2n)_{AVE} < 0.015 \quad (1)$$

The conditional expression (1) is intended to satisfactorily correct axial chromatic aberration at the telephoto end and lateral chromatic aberration at the wide angle end over a wide wavelength range of from a visible range to a near-infrared range. The conditional expression (1) is an index for correcting the axial chromatic aberration and the lateral chromatic aberration at the wavelength of 400 nm and the wavelength of 1,700 nm with the at least one positive lens and the at least one negative lens included in the second lens unit G2, and for estimating an amount of axial chromatic aberration and an amount of lateral chromatic aberration at the wavelength of 1,050 nm, which are generated during the correction.

In other words, the conditional expression (1) is intended to estimate secondary spectrum. In a combination of the positive lens and the negative lens, the amount of secondary spectrum becomes smaller as the index becomes smaller. Accordingly, when the range of Conditional Expression (1) is satisfied, the secondary spectrum can be reduced, and the axial chromatic aberration can be corrected favorably across a broad wavelength range from a visible range to a near-infrared range.

When the ratio falls below the lower limit or exceeds the upper limit of Conditional Expression (1), the secondary spectra of the axial chromatic aberration and the lateral chromatic aberration are generated in a large amount at the telephoto end and at the wide angle end, respectively, by the second lens unit G2, and the imaging performance deteriorates. It is more preferred that the numerical value range of the conditional expression (1) be set as follows:

$$-0.019 < IR(G2p)_{AVE} - \theta IR(G2n)_{AVE} < 0.014 \quad (1a).$$

In each of Embodiments, it is further preferred to satisfy at least one of the following conditional expressions.

An Abbe number ν of a material is defined as:

$$\nu = (Nm-1)/(Ns-Nl),$$

and an average value of Abbe numbers of materials of the at least one positive lens included in the second lens unit is represented by $\nu IR(G2p)_{AVE}$.

An Abbe number of a material of one negative lens included in the first lens unit G1 is represented by $\nu IR(Gin)$. A focal length of the first lens unit G1 is represented by F1, and a focal length of the second lens unit G2 is represented by F2. A relative partial dispersion of materials of all of the at least one negative lens included in the second lens unit G2 is represented by $\theta IR(G2n)_{ALL}$. An Abbe number and a relative partial dispersion of a material of at least one of the at least one negative lens included in the second lens unit G2 are represented by $\nu IR(G2n)$ and $\theta IR(G2n)$, respectively.

It is preferred to satisfy at least one of the following conditional expressions.

$$\nu IR(G2p)_{AVE} > 18.0 \quad (2)$$

$$\nu IR(G1n) > 18.0 \quad (3)$$

$$0.7 < |F1/F2| < 1.0 \quad (4)$$

$$\theta IR(G2n)_{ALL} < 0.845 \quad (5)$$

$$\nu IR(G2n) > 12.0 \quad (6)$$

$$\theta IR(G2n) < 0.81 \quad (7)$$

Next, the technical meanings of each of the conditional expressions described above are described. Conditional Expression (2) relates to an average value of the Abbe numbers of the materials for all the positive lenses included in the second lens unit G2. When the value falls below the lower limit of Conditional Expression (2), the refractive powers for the positive lenses and the negative lenses included in the second lens unit G2 are increased, and high-order aberrations are generated in a large amount. Further, the axial chromatic aberration and the lateral chromatic aberration are generated in a large amount by the second lens unit G2, and it becomes difficult to correct those aberrations.

The conditional expression (3) relates to the Abbe number of the material of the one negative lens included in the first lens unit G1. When $\nu IR(G1n)$ falls below the lower limit of the conditional expression (3), refractive powers of the positive lens and the negative lens included in the first lens unit G1 are increased, and hence large higher-order aberration is generated. Moreover, large axial chromatic aberration is generated by the first lens unit G1, and it becomes difficult to correct those various aberrations.

The conditional expression (4) relates to a ratio between the focal length F1 of the first lens unit G1 with respect to the d-line and the focal length F2 of the second lens unit G2 with respect to the d-line. When the ratio falls below the lower limit of the conditional expression (4), and the focal length of the first lens unit G1 becomes too short, a total length of the zoom lens becomes long, and it becomes difficult to downsize an entire system of the zoom lens. Moreover, when the ratio exceeds the upper limit of the conditional expression (4), and the focal length of the second lens unit G2 becomes too long, it becomes difficult to realize a telephoto property.

The conditional expression (5) relates to the materials of all of the at least one negative lens included in the second lens unit G2. When $\theta IR(G2n)_{ALL}$ exceeds the upper limit value of the conditional expression (5), large secondary spectrum of the axial chromatic aberration and the lateral chromatic aberration are generated by the at least one negative lens included in the second lens unit G2. It becomes difficult to correct these secondary spectrum with the at least one positive lens included in the second lens unit G2, and image forming performance is reduced.

The conditional expressions (6) and (7) relate to the material of the at least one of the at least one negative lens included in the second lens unit G2.

When $\nu IR(G2n)$ falls below the lower limit value of the conditional expression (6) and $\theta IR(G2n)$ exceeds the upper limit value of the conditional expression (7), the larger secondary spectrum of the axial chromatic aberration and the lateral chromatic aberration are generated by the at least one negative lens included in the second lens unit G2. At this time, it becomes difficult to correct the secondary spectrum with the at least one negative lens included in the second lens unit G2, and the image forming performance is reduced. It is more preferred to set the numerical value ranges of the conditional expressions (2) to (7) as follows:

$$\nu IR(G2p)_{AVE} > 18.2 \quad (2a)$$

$$\nu IR(G1n) > 20.0 \quad (3a)$$

$$0.72 < |F1/F2| < 0.98 \quad (4a)$$

$$\theta IR(G2n)_{ALL} < 0.842 \quad (5a)$$

$$\nu IR(G2n) > 12.3 \quad (6a)$$

$$\theta IR(G2n) < 0.805 \quad (7a)$$

It is preferred that a zoom lens according to each of Embodiments have the following configuration. When the second lens unit G2 includes a positive lens L21 closest to the object side, and when at least one surface of the positive lens L21 has an aspherical shape, it becomes easy to correct spherical aberration. Moreover, when the second lens unit G2 includes, in order from the object side to the image side, a positive lens, and a cemented lens formed by cementing a negative lens and a positive lens, it becomes easy to correct the axial chromatic aberration and the spherical aberration, and hence to realize a large aperture.

When the second lens unit G2 includes, in order from the object side to the image side, a positive lens, a negative lens, a positive lens, a negative lens, and a positive lens, it becomes easy to correct the axial chromatic aberration and the lateral chromatic aberration, and high image forming performance is obtained. Moreover, when the second lens unit G2 is configured to include a cemented lens formed by cementing a negative lens, a positive lens, and a negative lens, it becomes easy to correct the chromatic aberration and the higher-order aberration with the cemented lens.

When the second lens unit G2 includes, in order from the object side to the image side, a positive lens, a positive lens, and a negative lens, it becomes easy to correct the spherical aberration, and to realize the large aperture. When the second lens unit G2 includes, in order from the object side to the image side, a positive lens, and a cemented lens formed by cementing a positive lens and a negative lens, it becomes easy to correct the axial chromatic aberration and the spherical aberration, and hence to realize the large aperture.

One aspect of the zoom lens according to the present invention may include, in order from an object side to an image side, the first lens unit G1 having a negative refractive power, the aperture stop STOP, the second lens unit G2 having a positive refractive power, and the third lens unit G3 having a positive refractive power. A configuration in which an interval between the first lens unit G1 and the second lens unit G2 in an optical axis direction is changed to vary a magnification, and in which the first lens unit G1 is moved in the optical axis direction to correct an image plane variation accompanying the magnification varying may be adopted. This configuration provides an effect of satisfactorily correcting off-axial aberrations with the third lens unit G3.

When the above-mentioned configuration is adopted, the zoom lens in which the aberrations are reduced over the wide wavelength range of from the visible range to the near-infrared range may be obtained. Now, a lens configuration of the zoom lens according to each of Embodiments is described. Every lens configuration is described below as being arranged in order from the object side to the image side.

Embodiment 1

The zoom lens of Embodiment 1 is described. The zoom lens of Embodiment 1 includes the first lens unit G1 having a negative refractive power, the aperture stop STOP that determines a predetermined aperture, and the second lens unit G2 having a positive refractive power. The optical block CG is arranged between the second lens unit G2 and the image plane IMG. If this optical block CG is not necessary, the optical block CG can be omitted.

The first lens unit G1 consists of four lenses: a lens having a negative refractive power (hereinafter referred to as "negative lens") L11, a negative lens L12, a negative lens L13, and a lens having a positive refractive power (hereinafter referred to as "positive lens") L14. The negative lens L13 and the positive lens L14 are cemented to form a cemented lens.

The second lens unit G2 consists of six lenses: a positive lens L21, a negative lens L22, a positive lens L23, a negative lens L24, a positive lens L25, and a negative lens L26. The negative lens L22 and the positive lens L23 are cemented to form a cemented lens. The negative lens L24, the positive lens L25, and the negative lens L26 are cemented to form a cemented lens. Both surfaces of the positive lens L21 and a surface on an image plane side of the negative lens L26 have aspherical shapes.

The first lens unit G1 and the second lens unit G2 are configured to move along mutually different loci in the optical axis direction to vary the optical magnification, that is, to perform zooming. More specifically, an interval between the first lens unit G1 and the second lens unit G2 is changed to vary the magnification, and the first lens unit G1 is configured to move to correct an image plane variation accompanying the magnification varying.

Embodiment 2

A zoom lens according to Embodiment 2 of the present invention is described. The zoom lens according to Embodiment 2 is the same as that of Embodiment 1 in terms of the number of lens units, signs of refractive powers of the lens units, moving loci of the lens units during zooming, a position of the aperture stop STOP, and the like. The first lens unit G1 has the same lens configuration as that in Embodiment 1. The second lens unit G2 has the same lens configuration as that in Embodiment 1.

Embodiment 3

A zoom lens according to Embodiment 3 of the present invention is described. The zoom lens according to Embodiment 3 is the same as that of Embodiment 1 in terms of the number of lens units, signs of refractive powers of the lens units, moving loci of the lens units during zooming, a position of the aperture stop STOP, and the like.

The first lens unit G1 consists of three lenses: a negative lens L11, a negative lens L12, and a positive lens L13, and the negative lens L12 and the positive lens L13 form a cemented lens. A surface on the image side of the positive lens L13 has an aspherical shape. The second lens unit G2 consists of six lenses: a positive lens L21, a positive lens L22, a negative lens L23, a positive lens L24, a negative lens L25, and a positive lens L26. The positive lens L22 and the negative lens L23 are cemented to form a cemented lens. The negative lens L25 and the positive lens L26 are cemented to form a cemented lens. Both surfaces of the positive lens L21 and a surface on an image side of the positive lens L26 have aspherical shapes.

Embodiment 4

A zoom lens according to Embodiment 4 of the present invention is described. The zoom lens according to Embodiment 4 is the same as that of Embodiment 1 in terms of the number of lens units, signs of refractive powers of the lens units, moving loci of the lens units during zooming, a position of the aperture stop STOP, and the like. The first lens unit G1 has the same lens configuration as that in Embodiment 1. The second lens unit G2 consists of five lenses: a positive lens L21, a negative lens L22, a positive lens L23, a negative lens L24, and a positive lens L25. The negative lens L24 and the positive lens L25 are cemented to form a cemented lens. Both surfaces of the positive lens L21 and a surface on an image side of the positive lens L25 have aspherical shapes.

Embodiment 5

A zoom lens according to Embodiment 5 of the present invention is described. The zoom lens according to Embodiment 5 is the same as that of Embodiment 1 in terms of the number of lens units, signs of refractive powers of the lens units, moving loci of the lens units during zooming, a position of the aperture stop STOP, and the like.

The first lens unit G1 has the same lens configuration as that in Embodiment 1. The second lens unit G2 consists of seven lenses: a positive lens L21, a negative lens L22, a positive lens L23, a negative lens L24, a positive lens L25, a positive lens L26, and a negative lens L27. The negative lens L22 and the positive lens L23 are cemented to form a cemented lens. The positive lens L26 and the negative lens L27 are cemented to form a cemented lens. Both surfaces of the positive lens L21 and a surface on an image side of the negative lens L27 have aspherical shapes.

Embodiment 6

A zoom lens according to Embodiment 6 of the present invention is described. The zoom lens according to Embodiment 6 is the same as that of Embodiment 1 in terms of the number of lens units, signs of refractive powers of the lens units, moving loci of the lens units during zooming, a position of the aperture stop STOP, and the like. The first lens unit G1 has the same lens configuration as that in Embodiment 1. The second lens unit G2 consists of five lenses: a positive lens L21, a negative lens L22, a positive lens L23, a negative lens L24, and a positive lens L25. The negative lens L22 and the positive lens L23 are cemented to form a cemented lens. Both surfaces of the positive lens L21 and a surface on an image side of the positive lens L25 have aspherical shapes.

Embodiment 7

A zoom lens according to Embodiment 7 of the present invention is described. The zoom lens according to Embodiment 7 is the same as that of Embodiment 1 in terms of the number of lens units, signs of refractive powers of the lens units, moving loci of the lens units during zooming, a position of the aperture stop STOP, and the like.

The first lens unit G1 consists of three lenses: a negative lens L11, a negative lens L12, and a positive lens L13, and the negative lens L12 and the positive lens L13 form a cemented lens. A surface on the image side of the positive lens L13 has an aspherical shape. The second lens unit G2 consists of seven lenses: a positive lens L21, a positive lens L22, a negative lens L23, a negative lens L24, a positive lens L25, a negative lens L26, and a positive lens L27. The positive lens L22 and the negative lens L23 are cemented to form a cemented lens. The negative lens L26 and the positive lens L27 are cemented to form a cemented lens. Both surfaces of the positive lens L21 have aspherical shapes.

Embodiment 8

A zoom lens according to Embodiment 8 of the present invention is described. The zoom lens according to Embodiment 8 is the same as that of Embodiment 1 in terms of the number of lens units, signs of refractive powers of the lens units, moving loci of the lens units during zooming, a position of the aperture stop STOP, and the like. The first lens unit G1 has the same lens configuration as that in Embodiment 1. The second lens unit G2 consists of six lenses: a positive lens L21, a positive lens L22, a negative lens L23, a positive lens L24, a negative lens L25, and a positive lens L26. The negative lens L25 and the positive lens L26 are cemented to form a cemented lens. A surface on an object side of the positive lens L21 and a surface on an image side of the positive lens L26 have aspherical shapes.

Embodiment 9

A zoom lens according to Embodiment 9 is described. The zoom lens according to Embodiment 9 includes a first lens unit G1 having a negative refractive power, the aperture stop STOP that determines a predetermined aperture, a second lens unit G2 having a positive refractive power, and a third lens unit G3 having a positive refractive power. The optical block CG is arranged between the third lens unit G3 and the image plane IMG. If this optical block CG is not necessary, the optical block CG can be omitted.

The first lens unit G1 has the same lens configuration as that in Embodiment 1. The second lens unit G2 has the same lens configuration as that in Embodiment 1. The third lens unit G3 consists of two lenses: a negative lens L31 and a positive lens L32, and the negative lens L31 and the positive lens L32 are cemented to form a cemented lens. The first lens unit G1 and the second lens unit G2 are configured to move in the optical axis direction to vary an optical magnification. More specifically, an interval between the first lens unit G1 and the second lens unit G2 is changed to vary a magnification, and the first lens unit G1 is configured to move to correct an image plane variation accompanying the magnification varying.

Next, an Embodiment of a monitoring camera (image pickup apparatus) using the zoom lens according to the present invention as a photographic optical system is described with reference to FIG. 19. In FIG. 19, a monitoring camera main body 30, and an image pickup optical system 31 formed of the zoom lens described in any one of Embodiments 1 to 9 are illustrated. A solid-state image pickup element (photoelectric conversion element) 32 such as a charge coupled device (CCD) sensor or a complementary metal oxide semiconductor (CMOS) sensor is included in the camera main body to receive light of a subject image formed by the image pickup optical system 31.

A memory 33 is configured to record information corresponding to the subject image, which has been photoelectrically converted by the solid-state image pickup element 32. A network cable 34 is configured to transfer the captured subject image, which has been photoelectrically converted by the solid-state image pickup element 32.

Next, numerical value data corresponding to each of Embodiments 1 to 9 is shown. In each set of numerical value data, the order of a surface from the object side is represented by i, a curvature radius of the i-th surface (in units of mm) is represented by ri, and an interval between the i-th surface and the (i+1)th surface (in units of mm) is represented by di. A refractive index and an Abbe number of a material of the i-th optical member with reference to the d-line (wavelength: 587.6 nm) are represented by ndi and vdi, respectively.

The Abbe number vd with reference to the d-line is $vd=(Nd-1)/(NF-Nc)$, where NF represents a refractive index of a material at a wavelength of 486 nm, Nd represents a refractive index of a material at a wavelength of 587.6 nm, and Nc represents a refractive index of a material at a wavelength of 656 nm. Further, two surfaces closest to the image side are planes corresponding to the optical block. The focal length is a value at a wavelength of 587.6 nm.

The aspherical shape is expressed through a general aspherical expression as in the following expression. In the following expression, symbol Z represents a coordinate in the optical axis direction, symbol c represents a curvature (inverse of curvature radius r), symbol h represents a height from the optical axis, symbol K represents a conic constant, and symbols A, B, C, D, and E represent fourth-order, sixth-order, eighth-order, tenth-order, and twelfth-order aspherical coefficients, respectively.

$$z = \frac{ch^2}{1+\sqrt{1-(1+k)c^2h^2}} + Ah^4 + Bh^6 + Ch^8 + Dh^{10} + Eh^{12}$$

Symbol * means a surface having an aspherical shape. In addition, a relationship between each of the conditional expressions described above and values in the numerical embodiments is shown in Table 1. In table 1, symbol x means "unsatisfied".

(Numerical Data 1)

Surface Data

| Surface number i | ri | di | ndi | vdi |
|---|---|---|---|---|
| 1 | 21.637 | 0.85 | 1.83481 | 42.73 |
| 2 | 7.455 | 5.11 | | |
| 3 | −69.055 | 0.80 | 1.43875 | 94.95 |
| 4 | 11.891 | 3.09 | | |
| 5 | −15.802 | 0.80 | 1.43875 | 94.95 |
| 6 | 11.370 | 3.50 | 1.61340 | 44.27 |
| 7 | −29.824 | d7 | | |
| 8 (Stop) | ∞ | d8 | | |
| 9* | 9.334 | 3.50 | 1.59522 | 67.74 |
| 10* | −25.868 | 0.40 | | |
| 11 | −39.659 | 0.50 | 1.48749 | 70.24 |
| 12 | 9.060 | 3.50 | 1.59522 | 67.74 |
| 13 | −20.728 | 0.15 | | |
| 14 | 46.948 | 0.80 | 1.83400 | 37.16 |
| 15 | 4.781 | 5.50 | 1.59522 | 67.74 |
| 16 | −5.898 | 0.80 | 1.61340 | 44.27 |
| 17* | −58.843 | d17 | | |
| 18 | ∞ | 2.78 | 1.51633 | 64.14 |
| 19 | ∞ | 3.40 | | |
| 20 | ∞ | 0.50 | | |
| 21 | ∞ | | | |

Aspherical surface data

Surface number

| 9 | K = 0 | A = −1.04562E−04 | B = −1.53475E−06 | C = 1.43442E−08 | D = 0 | E = 0 |
| 10 | K = 0 | A = 2.02866E−04 | B = −1.47730E−06 | C = 3.16029E−08 | D = 0 | E = 0 |
| 17 | K = 0 | A = 8.47403E−06 | B = 8.14422E−06 | C = −4.39089E−07 | D = 0 | E = 0 |

Various data

| | Wide angle end | Intermediate | Telephoto end |
|---|---|---|---|
| Focal length | 2.85 | 5.29 | 9.81 |
| Fno | 1.26 | 1.59 | 2.44 |
| Image height | 3.0 | 3.0 | 3.0 |
| d7 | 19.32 | 7.34 | 0.50 |
| d8 | 9.20 | 3.27 | 0.50 |
| d17 | 0.50 | 3.49 | 9.15 |

(Numerical Data 2)

Surface Data

| Surface number i | ri | di | ndi | vdi |
|---|---|---|---|---|
| 1 | 31.532 | 0.85 | 1.83481 | 42.73 |
| 2 | 12.055 | 3.35 | | |
| 3 | −48.601 | 0.80 | 1.43875 | 94.95 |
| 4 | 6.833 | 4.00 | | |
| 5 | −11.601 | 0.80 | 1.43875 | 94.95 |
| 6 | 10.766 | 5.39 | 1.61340 | 44.27 |
| 7 | −32.531 | d7 | | |
| 8 (Stop) | ∞ | d8 | | |
| 9* | 8.812 | 4.20 | 1.49700 | 81.55 |
| 10* | −24.508 | 0.20 | | |
| 11 | 21.694 | 0.80 | 1.78800 | 47.37 |
| 12 | 7.038 | 4.50 | 1.59522 | 67.74 |
| 13 | −13.615 | 0.15 | | |
| 14 | −80.907 | 0.80 | 1.78800 | 47.37 |
| 15 | 5.099 | 5.50 | 1.59522 | 67.74 |
| 16 | −7.912 | 0.80 | 1.80100 | 34.97 |
| 17* | −15.956 | d17 | | |
| 18 | ∞ | 2.78 | 1.51633 | 64.14 |
| 19 | ∞ | 3.40 | | |
| 20 | ∞ | 0.50 | | |
| 21 | ∞ | | | |

Aspherical surface data

Surface number

| | | | | |
|---|---|---|---|---|
| 9 | K = 0   A = −1.81600E−04 | B = 1.61060E−06 | C = −2.51568E−08 | D = 2.60516E−10 |
| | E = 0 | | | |
| 10 | K = 0   A = 2.93798E−04 | B = 2.42389E−06 | C = −3.21214E−09 | D = 2.62232E−10 |
| | E = 0 | | | |
| 17 | K = 0   A = −1.19728E−05 | B = −7.26582E−06 | C = 3.60375E−07 | D = −1.22106E−08 |
| | E = 0 | | | |

Various data

| | Wide angle end | Intermediate | Telephoto end |
|---|---|---|---|
| Focal length | 3.10 | 6.31 | 7.99 |
| Fno | 1.26 | 1.60 | 1.80 |
| Image height | 3.0 | 3.0 | 3.0 |
| d7 | 14.04 | 1.44 | 0.50 |
| d8 | 9.20 | 2.88 | 0.50 |
| d17 | 0.50 | 4.87 | 7.21 |

(Numerical Data 3)

Surface Data

| Surface number i | ri | di | ndi | vdi |
|---|---|---|---|---|
| 1 | 76.230 | 0.85 | 1.81600 | 46.62 |
| 2 | 7.809 | 5.74 | | |
| 3 | −14.763 | 0.80 | 1.43875 | 94.95 |
| 4 | 10.048 | 7.50 | 1.72047 | 34.71 |
| 5* | 411.189 | d5 | | |
| 6 (Stop) | ∞ | d6 | | |
| 7* | 11.722 | 3.20 | 1.49700 | 81.55 |
| 8* | −13.208 | 0.15 | | |
| 9 | 28.840 | 2.70 | 1.49700 | 81.55 |
| 10 | −13.831 | 0.80 | 1.75700 | 47.82 |
| 11 | 12.765 | 0.40 | | |
| 12 | 14.395 | 3.50 | 1.59522 | 67.74 |
| 13 | −9.848 | 0.15 | | |
| 14 | 212.958 | 0.80 | 1.61340 | 44.27 |
| 15 | 4.755 | 4.50 | 1.59522 | 67.74 |
| 16* | 33.776 | d16 | | |
| 17 | ∞ | 2.78 | 1.51633 | 64.14 |
| 18 | ∞ | 2.50 | | |
| 19 | ∞ | 0.50 | | |
| 20 | ∞ | | | |

-continued

Aspherical surface data

| Surface number | | | | | |
|---|---|---|---|---|---|
| 5 | K = 0 | A = 3.96735E−05 | B = −8.34430E−08 | C = 1.24422E−08 | D = 0 |
|   | E = 0 | | | | |
| 7 | K = 0 | A = −2.34818E−04 | B = −1.72668E−07 | C = 1.76004E−08 | D = 1.58866E−09 |
|   | E = 0 | | | | |
| 8 | K = 0 | A = 2.14493E−04 | B = 2.01999E−06 | C = −3.74240E−08 | D = 3.32619E−09 |
|   | E = 0 | | | | |
| 16 | K = 0 | A = 2.41012E−04 | B = 2.48282E−06 | C = 6.17452E−08 | D = −6.56441E−09 |
|   | E = 0 | | | | |

Various data

| | Wide angle end | Intermediate | Telephoto end |
|---|---|---|---|
| Focal length | 3.10 | 4.98 | 7.99 |
| Fno | 1.26 | 1.40 | 1.80 |
| Image height | 3.0 | 3.0 | 3.0 |
| d5 | 15.79 | 6.56 | 0.50 |
| d6 | 6.84 | 2.74 | 0.50 |
| d16 | 0.50 | 2.40 | 5.56 |

(Numerical Data 4)

Surface Data

| Surface number i | ri | di | ndi | νdi |
|---|---|---|---|---|
| 1 | 25.087 | 0.85 | 1.81600 | 46.62 |
| 2 | 10.350 | 3.32 | | |
| 3 | 61.431 | 0.80 | 1.43875 | 94.95 |
| 4 | 7.230 | 4.52 | | |
| 5 | −14.545 | 0.80 | 1.43875 | 94.95 |
| 6 | 12.935 | 6.00 | 1.80100 | 34.97 |
| 7 | 403.897 | d7 | | |
| 8 (Stop) | ∞ | d8 | | |
| 9* | 7.343 | 4.50 | 1.49700 | 81.55 |
| 10* | −13.060 | 0.30 | | |
| 11 | 161.361 | 0.80 | 1.75700 | 47.82 |
| 12 | 7.638 | 0.60 | | |
| 13 | 9.259 | 3.50 | 1.59522 | 67.74 |
| 14 | −10.043 | 0.31 | | |
| 15 | −12.877 | 0.80 | 1.61340 | 44.27 |
| 16 | 5.281 | 4.50 | 1.59522 | 67.74 |
| 17* | −19.943 | d17 | | |
| 18 | ∞ | 2.78 | 1.51633 | 64.14 |
| 19 | ∞ | 3.40 | | |
| 20 | ∞ | 0.50 | | |
| 21 | ∞ | | | |

Aspherical surface data

| Surface number | | | | | |
|---|---|---|---|---|---|
| 9 | K = 0 | A = −3.10073E−04 | B = −2.90664E−07 | C = −3.26296E−09 | D = −3.30170E−10 |
|   | E = 0 | | | | |
| 10 | K = 0 | A = 4.99480E−04 | B = 6.47974E−07 | C = 1.03739E−08 | D = 1.02358E−09 |
|   | E = 0 | | | | |
| 17 | K = 0 | A = 4.37463E−05 | B = 4.57821E−06 | C = −1.26918E−07 | D = 2.53399E−09 |
|   | E = 0 | | | | |

Various data

| | Wide angle end | Intermediate | Telephoto end |
|---|---|---|---|
| Focal length | 3.10 | 4.98 | 7.99 |
| Fno | 1.35 | 1.60 | 1.90 |
| Image height | 3.0 | 3.0 | 3.0 |
| d7 | 15.39 | 5.34 | 0.50 |
| d8 | 5.47 | 3.27 | 0.50 |
| d17 | 0.86 | 3.21 | 7.04 |

(Numerical Data 5)

| Surface Data | | | | |
|---|---|---|---|---|
| Surface number i | ri | di | ndi | vdi |
| 1 | 18.488 | 0.85 | 1.83481 | 42.73 |
| 2 | 8.950 | 4.40 | | |
| 3 | −120.129 | 0.80 | 1.43875 | 94.95 |
| 4 | 7.342 | 4.00 | | |
| 5 | −15.684 | 0.80 | 1.43875 | 94.95 |
| 6 | 9.559 | 3.30 | 1.61340 | 44.27 |
| 7 | −55.550 | d7 | | |
| 8 (Stop) | ∞ | d8 | | |
| 9* | 10.473 | 3.70 | 1.59522 | 67.74 |
| 10* | −15.594 | 0.15 | | |
| 11 | −28.453 | 0.80 | 1.64000 | 60.08 |
| 12 | 13.162 | 4.00 | 1.59522 | 67.74 |
| 13 | −13.219 | 0.30 | | |
| 14 | −36.745 | 0.80 | 1.83400 | 37.16 |
| 15 | 9.420 | 0.32 | | |
| 16 | 9.691 | 3.00 | 1.59522 | 67.74 |
| 17 | −16.403 | 0.16 | | |
| 18 | 37.265 | 3.30 | 1.59522 | 67.74 |
| 19 | −7.959 | 0.80 | 1.61340 | 44.27 |
| 20* | 35.632 | d20 | | |
| 21 | ∞ | 2.78 | | |
| 22 | ∞ | 3.40 | 1.51633 | 64.14 |
| 23 | ∞ | 0.50 | | |
| 24 | ∞ | | | |

| Aspherical surface data | | | | | |
|---|---|---|---|---|---|
| Surface number | | | | | |
| 9 | K = 0  A = −1.35805E−04 | B = 4.98236E−07 | C = −1.54009E−08 | D = 0 | E = 0 |
| 10 | K = 0  A = 2.88682E−04 | B = 0 | C = 0 | D = 0 | E = 0 |
| 20 | K = 0  A = 1.47907E−04 | B = 3.95693E−07 | C = 2.48465E−07 | D = 0 | E = 0 |

| Various data | | | |
|---|---|---|---|
| | Wide angle end | Intermediate | Telephoto end |
| Focal length | 2.85 | 7.22 | 9.81 |
| Fno | 1.30 | 2.10 | 2.60 |
| Image height | 3.0 | 3.0 | 3.0 |
| d7 | 19.09 | 1.85 | 0.50 |
| d8 | 7.25 | 2.88 | 0.50 |
| d20 | 0.50 | 6.30 | 9.83 |

(Numerical Data 6)

| Surface Data | | | | |
|---|---|---|---|---|
| Surface number i | ri | di | ndi | vdi |
| 1 | 23.706 | 0.85 | 1.81600 | 46.62 |
| 2 | 11.427 | 3.82 | | |
| 3 | −218.973 | 0.80 | 1.43875 | 94.95 |
| 4 | 7.030 | 4.59 | | |
| 5 | −14.332 | 0.80 | 1.43875 | 94.95 |
| 6 | 13.175 | 6.00 | 1.80100 | 34.97 |
| 7 | 504.532 | d7 | | |
| 8 (Stop) | ∞ | d8 | | |
| 9* | 7.240 | 4.56 | 1.53775 | 74.70 |
| 10* | −14.512 | 0.18 | | |
| 11 | 376.468 | 0.80 | 1.75700 | 47.82 |
| 12 | 4.981 | 4.20 | 1.59522 | 67.74 |
| 13 | −8.986 | 0.32 | | |
| 14 | −8.513 | 0.80 | 1.61340 | 44.27 |
| 15 | 8.336 | 0.15 | | |
| 16 | 8.338 | 4.50 | 1.59522 | 67.74 |
| 17* | −13.716 | d17 | | |
| 18 | ∞ | 2.78 | 1.51633 | 64.14 |
| 19 | ∞ | 3.40 | | |
| 20 | ∞ | 0.50 | | |
| 21 | ∞ | | | |

-continued

Aspherical surface data

Surface number

| | | | | | |
|---|---|---|---|---|---|
| 9 | K = 0 | A = −2.30876E−04 | B = −5.76941E−07 | C = 2.89000E−08 | D = −7.16582E−10 |
| | E = 0 | | | | |
| 10 | K = 0 | A = 4.69653E−04 | B = −1.60004E−07 | C = 7.91959E−08 | D = −4.76940E−10 |
| | E = 0 | | | | |
| 17 | K = 0 | A = 5.13853E−05 | B = 4.82930E−06 | C = −1.75412E−07 | D = 4.01775E−09 |
| | E = 0 | | | | |

Various data

| | Wide angle end | Intermediate | Telephoto end |
|---|---|---|---|
| Focal length | 3.10 | 4.98 | 7.99 |
| Fno | 1.35 | 1.60 | 1.90 |
| Image height | 3.0 | 3.0 | 3.0 |
| d7 | 15.05 | 5.19 | 0.50 |
| d8 | 5.40 | 3.27 | 0.50 |
| d17 | 0.50 | 2.92 | 6.89 |

(Numerical Data 7)

Surface Data

| Surface number i | ri | di | ndi | vdi |
|---|---|---|---|---|
| 1 | 322.085 | 0.85 | 1.81600 | 46.62 |
| 2 | 8.066 | 5.61 | | |
| 3 | −12.777 | 0.80 | 1.43875 | 94.95 |
| 4 | 9.692 | 7.00 | 1.72047 | 34.71 |
| 5* | 293.330 | d5 | | |
| 6 (Stop) | ∞ | d6 | | |
| 7* | 8.497 | 3.00 | 1.49700 | 81.55 |
| 8* | −25.115 | 0.30 | | |
| 9 | −45.720 | 3.00 | 1.49700 | 81.55 |
| 10 | −8.636 | 0.80 | 1.75700 | 47.82 |
| 11 | −13.130 | 0.15 | | |
| 12 | 21.441 | 0.80 | 1.75700 | 47.82 |
| 13 | 6.865 | 0.52 | | |
| 14 | 7.805 | 3.50 | 1.59522 | 67.74 |
| 15 | −11.124 | 0.30 | | |
| 16 | −9.727 | 0.80 | 1.61340 | 44.27 |
| 17 | 6.344 | 4.50 | 1.59522 | 67.74 |
| 18 | −20.284 | d18 | | |
| 19 | ∞ | 2.78 | 1.51633 | 64.14 |
| 20 | ∞ | 2.50 | | |
| 21 | ∞ | 0.50 | | |
| 22 | ∞ | | | |

Aspherical surface data

Surface number

| | | | | | |
|---|---|---|---|---|---|
| 5 | K = 0 | A = 4.80522E−05 | B = 1.14454E−07 | C = 1.26956E−08 | D = 0 |
| | E = 0 | | | | |
| 7 | K = 0 | A = −1.59433E−04 | B = −1.04267E−06 | C = 1.62384E−08 | D = −3.67473E−10 |
| | E = 0 | | | | |
| 8 | K = 0 | A = 2.21594E−04 | B = 0 | C = 0 | D = 0 |
| | E = 0 | | | | |

Various data

| | Wide angle end | Intermediate | Telephoto end |
|---|---|---|---|
| Focal length | 3.10 | 4.98 | 8.00 |
| Fno | 1.26 | 1.40 | 1.80 |
| Image height | 3.0 | 3.0 | 3.0 |
| d5 | 16.87 | 6.24 | 0.50 |
| d6 | 4.91 | 2.74 | 0.50 |
| d18 | 0.50 | 2.81 | 6.59 |

(Numerical Data 8)

Surface Data

| Surface number i | ri | di | ndi | vdi |
|---|---|---|---|---|
| 1 | 19.787 | 0.85 | 1.83481 | 42.73 |
| 2 | 7.075 | 3.90 | | |
| 3 | 101.316 | 0.80 | 1.49700 | 81.55 |
| 4 | 11.085 | 2.73 | | |
| 5 | −16.593 | 0.80 | 1.43875 | 94.95 |
| 6 | 11.665 | 5.50 | 1.72047 | 34.71 |
| 7 | −84.315 | d7 | | |
| 8 (Stop) | ∞ | d8 | | |
| 9* | 19.529 | 3.00 | 1.49700 | 81.55 |
| 10 | −19.282 | 0.29 | | |
| 11 | 13.670 | 3.50 | 1.49700 | 81.55 |
| 12 | −15.993 | 0.15 | | |
| 13 | −85.322 | 0.80 | 1.75700 | 47.82 |
| 14 | 8.086 | 0.50 | | |
| 15 | 9.260 | 3.50 | 1.59522 | 67.74 |
| 16 | −10.361 | 0.15 | | |
| 17 | −15.147 | 1.00 | 1.61340 | 44.27 |
| 18 | 4.8141616 | 4.70 | 1.59522 | 67.74 |
| 19* | −59.23464 | d19 | | |
| 20 | ∞ | 2.00 | 1.51633 | 64.14 |
| 21 | ∞ | 3.00 | | |
| 22 | ∞ | 0.5 | | |
| 23 | ∞ | | | |

Aspherical surface data

Surface number

9     K = 0   A = −2.80960E−04   B = −3.66950E−06   C = 8.96363E−08   D = −2.69984E−09
       E = 0

19    K = 0   A = 2.76278E−04   B = 2.92100E−06   C = −1.92687E−07   D = 2.24851E−09
       E = 0

Various data

| | Wide angle end | Intermediate | Telephoto end |
|---|---|---|---|
| Focal length | 3.10 | 4.98 | 7.99 |
| Fno | 1.40 | 1.60 | 2.00 |
| Image height | 3.0 | 3.0 | 3.0 |
| d7 | 15.17 | 5.61 | 0.50 |
| d8 | 6.39 | 3.27 | 0.50 |
| d19 | 0.78 | 3.06 | 6.81 |

(Numerical Data 9)

Surface Data

| Surface number i | ri | di | ndi | vdi |
|---|---|---|---|---|
| 1 | 46.138 | 0.85 | 1.81600 | 46.62 |
| 2 | 7.781 | 4.56 | | |
| 3 | −51.782 | 0.80 | 1.49700 | 81.55 |
| 4 | 21.674 | 2.61 | | |
| 5 | −14.787 | 0.80 | 1.43875 | 94.95 |
| 6 | 12.797 | 3.50 | 1.61340 | 44.27 |
| 7 | −24.117 | d7 | | |
| 8 (Stop) | ∞ | d8 | | |
| 9* | 11.123 | 3.30 | 1.59522 | 67.74 |
| 10* | −29.815 | 0.90 | | |
| 11 | −31.373 | 0.80 | 1.51633 | 64.14 |
| 12 | 10.705 | 4.20 | 1.59522 | 67.74 |
| 13 | −16.309 | 0.15 | | |
| 14 | 23.424 | 0.80 | 1.83400 | 37.16 |
| 15 | 5.425 | 4.40 | 1.59522 | 67.74 |
| 16 | −7.147 | 0.80 | 1.61340 | 44.27 |
| 17* | 115.045 | d17 | | |
| 18 | 33.505 | 0.50 | 1.73400 | 51.47 |
| 19 | 5.798 | 2.50 | 1.61272 | 58.72 |
| 20 | −89.669 | 0.50 | | |
| 21 | ∞ | 2.00 | 1.51633 | 64.14 |
| 22 | ∞ | 2.50 | | |

-continued

| | | |
|---|---|---|
| 23 | ∞ | 0.50 |
| 24 | ∞ | |

Aspherical surface data

Surface number

| 9 | K = 0 | A = −8.83781E−05 | B = −5.35461E−07 | C = 1.44171E−08 | D = 0 |
| | E = 0 | | | | |
| 10 | K = 0 | A = 1.45897E−04 | B = −2.23625E−07 | C = 2.28924E−08 | D = 0 |
| | E = 0 | | | | |
| 17 | K = 0 | A = 3.61815E−05 | B = 2.10254E−06 | C = −1.12172E−07 | D = 0 |
| | E = 0 | | | | |

Various data

| | Wide angle end | Intermediate | Telephoto end |
|---|---|---|---|
| Focal length | 2.85 | 5.29 | 9.82 |
| Fno | 1.40 | 1.59 | 2.44 |
| Image height | 3.0 | 3.0 | 3.0 |
| d7 | 20.98 | 7.69 | 0.50 |
| d8 | 8.55 | 3.27 | 0.50 |
| d17 | 0.50 | 3.76 | 9.82 |

TABLE 1

| Conditional Expression | Embodiment 1 | | | Embodiment 2 | | | Embodiment 3 | | Embodiment 4 | |
|---|---|---|---|---|---|---|---|---|---|---|
| (1) $\theta IR(G2p)_{AVE} - \theta IR(G2n)_{AVE}$ | 0.0136 | | | −0.0181 | | | −0.0051 | | −0.0016 | |
| (2) $\nu IR(G2p)_{AVE}$ | 18.36 | | | 19.39 | | | 19.91 | | 19.39 | |
| (3) $\nu IR(G1n)$ | 24.78 | | | 24.78 | | | 24.78 | | 24.78 | |
| (4) $|F1/F2|$ | 0.80 | | | 0.73 | | | 0.97 | | 0.79 | |
| (5) $\theta IR(G2n)_{ALL}$ | L22 0.73 | L24 0.84 | L26 0.80 | L22 0.80 | L24 0.80 | L26 0.84 | L23 0.80 | L25 0.80 | L22 0.80 | 024 0.80 |
| (6) $\nu IR(G2n)$ | 16.92 | | | 12.66 | | | 12.62 | | 12.62 | |
| (7) $\theta IR(G2n)$ | 0.73 | | | 0.80 | | | 0.80 | | 0.80 | |

| Conditional Expression | Embodiment 5 | | | Embodiment 6 | | Embodiment 7 | | |
|---|---|---|---|---|---|---|---|---|
| (1) $\theta IR(G2p)_{AVE} - \theta IR(G2n)_{AVE}$ | 0.0083 | | | −0.0007 | | −0.0045 | | |
| (2) $\nu IR(G2p)_{AVE}$ | 18.36 | | | 18.81 | | 19.91 | | |
| (3) $\nu IR(G1n)$ | 24.78 | | | 24.78 | | 24.78 | | |
| (4) $|F1/F2|$ | 0.75 | | | 0.76 | | 0.80 | | |
| (5) $\theta IR(G2n)_{ALL}$ | L22 0.75 | L24 0.84 | L27 0.80 | L22 0.80 | L24 0.80 | L22 0.80 | L24 0.80 | L26 0.80 |
| (6) $\nu IR(G2n)$ | 14.81 | | | 12.62 | | 12.62 | | |
| (7) $\theta IR(G2n)$ | 0.75 | | | 0.80x | | 0.80 | | |

| Conditional Expression | Embodiment 8 | | Embodiment 9 | | |
|---|---|---|---|---|---|
| (1) $\theta IR(G2p)_{AVE} - \theta IR(G2n)_{AVE}$ | −0.0051 | | 0.0087 | | |
| (2) $\nu IR(G2p)_{AVE}$ | 19.91 | | 18.36 | | |
| (3) $\nu IR(G1n)$ | 21.45 | | 21.45 | | |
| (4) $|F1/F2|$ | 0.81 | | 0.79 | | |
| (5) $\theta IR(G2n)_{ALL}$ | L23 0.80 | L25 0.80 | L22 0.75 | L24 0.84 | L26 0.80 |
| (6) $\nu IR(G2n)$ | 12.62 | | 15.81 | | |
| (7) $\theta IR(G2n)$ | 0.80 | | 0.75 | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-084092, filed Apr. 16, 2015, which is hereby incorporated by reference herein in its entirety.

What is claimed is:

1. A zoom lens, comprising, in order from an object side to an image side:
   a first lens unit having a negative refractive power;
   an aperture stop; and
   a second lens unit having a positive refractive power,
   wherein the first lens unit and the second lens unit are configured to move during zooming so that an interval between each pair of adjacent lens units is changed,
   wherein the second lens unit includes at least one positive lens and at least one negative lens, and
   wherein, when a refractive index of a material with respect to a wavelength of 400 nm is represented by Ns, a refractive index of the material with respect to a wavelength of 1,050 nm is represented by Nm, a refractive index of the material with respect to a wavelength of 1,700 nm is represented by Nl, and a relative partial dispersion θ of the material is expressed as:

$$\theta=(Ns-Nm)/(Ns-Nl),$$

the following conditional expression is satisfied:

$$-0.020<\theta IR(G2p)_{AVE}-\theta IR(G2n)_{AVE}<0.015,$$

where $\theta IR(G2p)_{AVE}$ represents an average value of relative partial dispersions of materials of the at least one positive lens included in the second lens unit, and $\theta IR(G2n)_{AVE}$ represents an average value of relative partial dispersions of materials of the at least one negative lens included in the second lens unit.

2. A zoom lens according to claim 1, wherein, when an Abbe number ν of a material is expressed as:

$$\nu=(Nm-1)/(Ns-Nl),$$

the following conditional expression is satisfied:

$$\nu IR(G2p)_{AVE}>18.0,$$

where $\nu IR(G2p)_{AVE}$ represents an average value of Abbe numbers of materials of the at least one positive lens included in the second lens unit.

3. A zoom lens according to claim 1, wherein the second lens unit includes a positive lens L21 closest to the object side, and at least one surface of the positive lens L21 has an aspherical shape.

4. A zoom lens according to claim 1, wherein the second lens unit includes, in order from the object side to the image side, a positive lens, and a cemented lens formed by cementing a negative lens and a positive lens.

5. A zoom lens according to claim 1, wherein the second lens unit includes, in order from the object side to the image side, a positive lens, a negative lens, a positive lens, a negative lens, and a positive lens.

6. A zoom lens according to claim 1, wherein the second lens unit includes a cemented lens formed by cementing a negative lens, a positive lens, and a negative lens.

7. A zoom lens according to claim 1, wherein the second lens unit includes, in order from the object side to the image side, a positive lens, a positive lens, and a negative lens.

8. A zoom lens according to claim 1, wherein the second lens unit includes, in order from the object side to the image side, a positive lens, and a cemented lens formed by cementing a positive lens and a negative lens.

9. A zoom lens according to claim 1, wherein the first lens unit includes a negative lens that satisfies the following conditional expression:

$$\nu IR(G1n)>18.0,$$

where $\nu IR(G1n)$ represents an Abbe number of a material of the negative lens included in the first lens unit.

10. A zoom lens according to claim 1, wherein the following conditional expression is satisfied:

$$0.7<|F1/F2|<1.0,$$

where F1 represents a focal length of the first lens unit, and F2 represents a focal length of the second lens unit.

11. A zoom lens according to claim 1, wherein each of the at least one negative lens included in the second lens unit satisfies the following conditional expression:

$$\theta IR(G2n)_{ALL}<0.845,$$

where $\theta IR(G2n)_{ALL}$ represents a relative partial dispersion of materials of each of the at least one negative lens included in the second lens unit.

12. A zoom lens according to claim 1, wherein the following conditional expression is satisfied:

$$\nu IR(G2n)>12.0,$$

$$\theta IR(G2n)<0.81,$$

where $\nu IR(G2n)$ and $\theta IR(G2n)$ represent an Abbe number and a relative partial dispersion, respectively, of materials of the at least one negative lens included in the second lens unit.

13. A zoom lens according to claim 1, further comprising a third lens unit having a positive refractive power on the image side of the second lens unit, the third lens unit being configured not to move during zooming.

14. An image pickup apparatus, comprising:
a zoom lens comprising, in order from an object side to an image side:
a first lens unit having a negative refractive power;
an aperture stop; and
a second lens unit having a positive refractive power,
wherein the first lens unit and the second lens unit are configured to move during zooming so that an interval between each pair of adjacent lens units is changed,
wherein the second lens unit includes at least one positive lens and at least one negative lens, and
wherein, when a refractive index of a material with respect to a wavelength of 400 nm is represented by Ns, a refractive index of the material with respect to a wavelength of 1,050 nm is represented by Nm, a refractive index of the material with respect to a wavelength of 1,700 nm is represented by Nl, and a relative partial dispersion θ of the material is expressed as:

$$\theta=(Ns-Nm)/(Ns-Nl),$$

the following conditional expression is satisfied:

$$-0.020<\theta IR(G2p)_{AVE}-\theta IR(G2n)_{AVE}<0.015,$$

where $\theta IR(G2p)_{AVE}$ represents an average value of relative partial dispersions of materials of the at least one positive lens included in the second lens unit, and $\theta IR(G2n)_{AVE}$ represents an average value of relative partial dispersions of materials of the at least one negative lens included in the second lens unit; and
an image pickup element configured to receive light of an image formed by the zoom lens.

* * * * *